(12) United States Patent
Poloni et al.

(10) Patent No.: US 11,687,071 B2
(45) Date of Patent: Jun. 27, 2023

(54) METHODS OF HEALTH DEGRADATION ESTIMATION AND FAULT ISOLATION FOR SYSTEM HEALTH MONITORING

(71) Applicant: Garrett Transportation I Inc., Torrance, CA (US)

(72) Inventors: Tomas Poloni, Malinovo (SK); Paul Dickinson, Bristol (GB); Jaroslav Pekar, Pacov (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/407,047

(22) Filed: Aug. 19, 2021

(65) Prior Publication Data

US 2023/0059686 A1    Feb. 23, 2023

(51) Int. Cl.
G05B 23/02      (2006.01)
F02D 41/00      (2006.01)
G05B 19/418     (2006.01)

(52) U.S. Cl.
CPC ..... *G05B 23/0294* (2013.01); *F02D 41/0052* (2013.01); *F02D 41/0072* (2013.01); *G05B 19/4184* (2013.01); *G05B 23/0213* (2013.01); *G05B 23/0243* (2013.01); *G05B 2219/24033* (2013.01)

(58) Field of Classification Search
None
See application file for complete search history.

(56) References Cited

U.S. PATENT DOCUMENTS

| | | | |
|---|---|---|---|
| 7,392,713 B2 | 7/2008 | Barkhoudarian |
| 7,805,940 B2 | 10/2010 | Burkhardt et al. |
| 8,700,546 B2 | 4/2014 | Germann et al. |
| 9,014,945 B2 | 4/2015 | Abrol et al. |
| 9,378,594 B2 | 6/2016 | Wong et al. |
| 9,677,476 B2 | 6/2017 | Smith et al. |
| 10,184,439 B2 | 1/2019 | Claude et al. |
| 10,277,041 B2 | 4/2019 | Zane et al. |
| 10,364,764 B2 | 7/2019 | Wang et al. |

(Continued)

FOREIGN PATENT DOCUMENTS

| | | | | |
|---|---|---|---|---|
| EP | 3246547 A1 | 9/2004 | | |
| WO | WO-2021061603 A1 | * | 4/2021 | ............. G06F 30/15 |

OTHER PUBLICATIONS

Moura et al; "Techniques for Battery Health Concious Power Management via Electrochemical Modeling and Optimal Control," University of Michigan, 52 pages, 2011.

(Continued)

*Primary Examiner* — Mohammad Ali
*Assistant Examiner* — David Earl Ogg
(74) *Attorney, Agent, or Firm* — Seager, Tufte & Wickhem, LLP

(57) ABSTRACT

Methods and systems for fault identification and mitigation in an engine system. A state observer obtains current state information from the engine system, and a feature calculator uses data obtained from the state observer to calculate one or more feature indicators, which are monitored by a health estimator for the occurrence of a change using one or more change probability models. When the health estimator identifies a change, a fault isolator determines a component of the engine system that is subject to fault or health deterioration.

14 Claims, 10 Drawing Sheets

(56) References Cited

U.S. PATENT DOCUMENTS

| | | | |
|---|---|---|---|
| 10,619,582 B2 | 4/2020 | Lutz et al. | |
| 10,641,214 B2 | 5/2020 | Dudar | |
| 10,970,183 B1* | 4/2021 | Aberg | G06F 11/321 |
| 2004/0186927 A1 | 9/2004 | Eryurek et al. | |
| 2006/0137340 A1 | 6/2006 | Stewart | |
| 2010/0114806 A1* | 5/2010 | Harrison | G06N 3/0436 |
| | | | 706/14 |
| 2012/0275899 A1* | 11/2012 | Chandler | F23N 5/242 |
| | | | 415/17 |
| 2012/0296614 A1* | 11/2012 | Johannaber | F02D 41/263 |
| | | | 703/8 |
| 2013/0046507 A1 | 2/2013 | Vega Paez et al. | |
| 2013/0255220 A1 | 10/2013 | Mathews, Jr. et al. | |
| 2014/0107885 A1 | 4/2014 | Hagen et al. | |
| 2014/0182298 A1* | 7/2014 | Krull | F02C 9/28 |
| | | | 60/773 |
| 2014/0372011 A1* | 12/2014 | Kim | F02D 41/0072 |
| | | | 701/108 |
| 2015/0034408 A1* | 2/2015 | Wu | F02B 37/007 |
| | | | 60/612 |
| 2015/0083096 A1 | 3/2015 | Zagone et al. | |
| 2016/0076438 A1 | 3/2016 | Tabata et al. | |
| 2016/0216699 A1 | 7/2016 | Pekar et al. | |
| 2016/0237927 A1 | 8/2016 | Long | |
| 2016/0265468 A1 | 9/2016 | Takayanagi et al. | |
| 2016/0336765 A1 | 11/2016 | Trimboli et al. | |
| 2016/0341142 A1* | 11/2016 | Taibi | F01N 11/002 |
| 2017/0044971 A1 | 2/2017 | Racca | |
| 2017/0096952 A1 | 4/2017 | Yu et al. | |
| 2017/0152799 A1 | 6/2017 | Lee et al. | |
| 2018/0051638 A1 | 2/2018 | Wang et al. | |
| 2018/0149064 A1 | 5/2018 | Pachner et al. | |
| 2018/0313277 A1 | 11/2018 | Banerjee et al. | |
| 2018/0334954 A1 | 11/2018 | Banker et al. | |
| 2018/0347408 A1 | 12/2018 | Collins et al. | |
| 2019/0063306 A1* | 2/2019 | Zhang | F02M 26/53 |
| 2019/0195526 A1 | 6/2019 | Drees et al. | |
| 2019/0258223 A1* | 8/2019 | Oota | G05B 19/406 |
| 2019/0285512 A1 | 9/2019 | Smith | |
| 2019/0353069 A1* | 11/2019 | Wagner | F01N 3/101 |
| 2020/0063683 A1 | 2/2020 | Cancellieri et al. | |
| 2020/0158041 A1 | 5/2020 | Smith | |
| 2020/0277064 A1 | 9/2020 | Thomassin et al. | |
| 2020/0285997 A1 | 9/2020 | Bhattacharyya et al. | |
| 2020/0409326 A1 | 12/2020 | Jiang et al. | |
| 2021/0262896 A1* | 8/2021 | Chen | F02M 26/49 |

OTHER PUBLICATIONS

U.S. Appl. No. 17/008,076 and the entirety of the application filed Aug. 31, 2020.

U.S. Appl. No. 16/951,208 and the entirety of the application filed Nov. 18, 2020.

U.S. Appl. No. 17/327,066 and the entirety of the application filed May 21, 2021.

Liu et al., "Modeling and Control of a Power-Split Hybrid Vehicle," IEEE Transaction on Control Systems Technology, vol. 16 (6), p. 1242-1251, Nov. 2008.

Rezaeianjouybari, Behnoush et al.: "Deep learning for prognostics and health management: State of the art, challenges, and opportunities", Measurement, Institute of Measurement and Control. London, GB, vol. 163, May 21, 2020 (May 21, 2020), 29 pages.

Extended European Search Report dated Oct. 5, 2022, EP Application No. 22173632.5, 9 pages.

* cited by examiner

| Health Indicator Change / Isolated Mode | $m_{A,EGR} \neq m_{A,\lambda}$ SPRT(I) | $m_{A,EGR} \neq m_{A,\lambda}$ SPRT(II) |
|---|---|---|
| No Fault (Mode 1) | 0 | 0 |
| EGR Fault (Mode 2) | 1 | 1 |
| EGR Aging (Mode 3) | 0 | 1 |

Fig. 8

METHODS OF HEALTH DEGRADATION ESTIMATION AND FAULT ISOLATION FOR SYSTEM HEALTH MONITORING

BACKGROUND

Vehicle engine systems have grown incredibly complex as new technologies are introduced and new standards for emissions and fuel efficiency are added. Model based control methods have been introduced to facilitate the management of complex technology and requirements. Hardware components can deviate from nominal behavior through aging, wear, and other degradation or failure scenarios, rendering a model used in the control method out of alignment with reality. New and alternative solutions are desired to allow a system to identify the occurrence of degradation and to isolate faults with greater accuracy and precision.

OVERVIEW

The present inventors have recognized, among other things, that a problem to be solved is the need for new and/or alternative approaches to health degradation estimation and fault isolation. A health monitoring system may have as a goal a determination of whether control algorithms are relying on component and/or system models that correspond to reality. As components age or deteriorate, the models can be updated or retuned to account for changing performance. If a component fails, the system model can be reconfigured to accommodate continued operation with updated control metrics. The aim in some examples herein is to identify the occurrence of a change, isolate the source of a change, and to then apply a mitigation.

A first illustrative and non-limiting example takes the form of a configurable controller for controlling a physical plant having associated therewith a plurality of actuators for controlling operation of the physical plant and a plurality of sensors for observing a plurality of characteristics of the physical plant operations, the configurable controller comprising: a state observer configured to capture the current state of the physical plant by communication with the plurality of sensors; a feature calculator configured to receive current state data from the state observer and calculate at least one feature parameter reflecting a state of health of at least one of component of the physical plant; an optimizer configured to optimize behavior of the physical plant using at least the actuators; a health estimator configured to receive the at least one feature parameter from the feature calculator and, subject to one or more entering conditions, apply a change probability model to the at least one feature parameter to determine whether the at least one feature parameter has changed to an extent indicative of a fault or health related degradation and, if so, to generate a change indicator; and a fault isolator configured to receive the change indicator and identify which component of the physical plant that is subject to a fault or health degradation, and to generate a fault indicator indicating the identified fault.

Additionally or alternatively, the configurable controller may further comprise a mitigator configured to modify the optimizer responsive to the fault indicator, wherein: the optimizer is configured to use a plurality of factors to optimize behavior of the physical plant, each factor associated with a weight, and, prior to the health estimator generating the change indicator, the optimizer uses a first set of weights; and the mitigator is configured to respond to the fault indicator by modifying or replacing the first set of weights to thereby modify the optimizer.

Additionally or alternatively, the optimizer is configured to use at least first and second models to optimize behavior of the physical plant, by: relying on the first model when the fault isolator fails to generate the fault indicator; and relying on the second model when the fault isolator generates the fault indicator.

Additionally or alternatively, the configurable controller may further comprise a mitigator configured to modify the state observer responsive to the fault indicator, wherein: the state observer is configured to apply one or more tuning parameters to monitor the current state of the physical plant; and the mitigator is configured to respond to the fault indicator by modifying or replacing one or more of the tuning parameters used by the state observer.

Another illustrative, non-limiting example takes the form of a system comprising the above described configurable controller and a physical plant comprising: an engine having an intake manifold and an exhaust manifold, with a combustion chamber therebetween into which a fuel quantity is provided; an airflow system coupled to the engine, the airflow system having a turbocharger having a compressor upstream of the intake manifold and a turbine downstream of the exhaust manifold, and an exhaust gas recirculation (EGR) valve configured to recirculate exhaust air from the exhaust manifold back to the intake manifold; and an aftertreatment system coupled to the airflow system downstream of the turbine; wherein the at least one feature parameter comprises: a first feature parameter related to mass air flow; a second feature parameter related to exhaust manifold air pressure; and a third feature parameter related to pressure downstream of the turbine.

Additionally or alternatively, the fault isolator is configured to determine which component of the physical plant is subject to fault by analysis of which of the at least one feature parameters has changed.

Additionally or alternatively, the fault isolator is configured to: determine the fault is with the EGR valve in response to finding that either or both of the first or second feature parameters have changed; or determine the fault is with the aftertreatment if the third feature parameter has changed.

Another illustrative, non-limiting example takes the form of a system comprising the above described configurable controller and a physical plant comprising: an engine having an intake manifold and an exhaust manifold, with a combustion chamber therebetween into which a fuel quantity is provided; an airflow system coupled to the engine, the airflow system having a turbocharger with a compressor and a twin scroll turbine, an exhaust gas recirculation (EGR) valve, a first exhaust airpath from the exhaust manifold to a first scroll of the turbine, a second exhaust airpath from the exhaust manifold to a second scroll of the turbine and a balance valve controllably allowing airflow between the first and second exhaust airpaths; and an aftertreatment system coupled to the airflow system downstream of the turbine; wherein the at least one feature parameter comprises: a first feature parameter related to mass air flow; a second feature parameter related to exhaust manifold air pressure; and a third feature parameter related to pressure downstream of the turbine Additionally or alternatively, the fault isolator is configured to determine which component of the physical plant is subject to fault by analysis of which of the at least one feature parameters has changed.

Additionally or alternatively, the fault isolator is configured to: identify an aftertreatment fault if the third feature parameter has changed; identify an EGR fault if both the first and second feature parameters have changed; or identify a balance valve fault if the second feature parameter has changed but the first feature parameter has not changed.

Another illustrative, non-limiting example takes the form of an engine system comprising: an engine having an intake manifold and an exhaust manifold, with a combustion chamber therebetween into which a fuel quantity is provided; an airflow system coupled to the engine, the airflow system having a turbocharger including a compressor and a turbine, and an exhaust gas recirculation (EGR) valve; an aftertreatment system including a Lambda sensor; and a configurable controller for controlling the engine, the airflow system, and the aftertreatment system, comprising: a state observer configured to capture the current state of the engine, airflow system, and aftertreatment system; a feature calculator configured to calculate a first feature parameter related to mass air flow, a second feature parameter related to exhaust manifold air pressure, and a third feature parameter related to pressure downstream of the turbine using data received from the state observer; an optimizer configured to optimize behavior of the engine, airflow system, and aftertreatment system using the current state of the engine and at least one model or setpoint; a health estimator configured to receive the first, second and third feature parameters and, subject to one or more entering conditions, apply a change probability model to the first, second, and third feature parameters to determine whether any of the first, second or third feature parameters has changed to an extent indicative of a fault and, if so, to generate a change indicator; and a fault isolator configured to receive the change indicator and identify a fault by identifying a system component that is subject to a fault as indicated by the change indicator, and generate a fault indicator indicating the identified fault.

Additionally or alternatively, the fault isolator is configured to: identify an aftertreatment fault if only the third feature parameter has changed; or identify an EGR fault if either one, or both of, the first and second feature parameters have changed.

Additionally or alternatively, the optimizer is configured to use each of: a first model related to aftertreatment airflow; and a second model related to EGR flow; and the system further comprises a health mitigator configured to modify operation of the optimizer to: replace or reduce reliance on the first model responsive to an identified aftertreatment fault; and replace or reduce reliance on the second model responsive to an identified EGR fault.

Additionally or alternatively, the engine system may further comprise an exhaust manifold pressure sensor, wherein: the optimizer comprises one or more models reliant on a pressure sensed by the exhaust manifold pressure sensor; and the health mitigator is configured, responsive to a fault, to increase reliance by the optimizer on the one or more models reliant on the pressure sensed by the exhaust manifold pressure sensor.

Additionally or alternatively, the engine system may further comprise a turbocharger speed sensor, wherein: the optimizer comprises one or more models reliant on a speed sensed by the turbocharger speed sensor; and the health mitigator is configured, responsive to a fault, to increase reliance by the optimizer on the one or more models reliant on the speed sensed by the turbocharger speed sensor.

Another illustrative, non-limiting example takes the form of an engine system comprising: an engine having an intake manifold and an exhaust manifold, with a combustion chamber therebetween into which a fuel quantity is provided; an airflow system coupled to the engine, the airflow system having a turbocharger having a compressor and a twin scroll turbine, an exhaust gas recirculation (EGR) valve, a first exhaust airpath from the exhaust manifold to a first scroll of the turbine, a second exhaust airpath from the exhaust manifold to a second scroll of the turbine and a balance valve controllably allowing airflow between the first and second exhaust airpaths; an aftertreatment system including a Lambda sensor; and a configurable controller for controlling the engine, the airflow system, and the aftertreatment system, comprising: a state observer configured to capture the current state of the engine, airflow system, and aftertreatment system; a feature calculator configured to calculate a first feature parameter related to mass air flow, a second feature parameter related to exhaust manifold air pressure, and a third feature parameter related to pressure downstream of the turbine using data obtained from the state observer; an optimizer configured to optimize behavior of the engine, airflow system, and aftertreatment system based on the current state of the engine and at least one model or setpoint; a health estimator configured to receive the first, second and third feature parameters and, subject to one or more entering conditions, apply a change probability model to the first, second, and third feature parameters to determine whether any of the first, second or third feature parameters has changed to an extent indicative of a fault and, if so, to generate a change indicator; and a fault isolator configured to receive the change indicator and identify a fault by identifying a system component that is subject to a fault and generate a fault indicator indicating the identified fault.

Additionally or alternatively, the fault isolator is configured to: identify an aftertreatment fault if the third feature parameter has changed; identify an EGR fault if both the first and second feature parameters have changed; or identify a balance valve fault if the second feature parameter has changed but the second feature parameter has not changed.

Additionally or alternatively, the optimizer is configured to use each of: a first model related to aftertreatment airflow; a second model related to EGR flow; and a third model related to balance valve flow; and the system further comprises a health mitigator configured to modify operation of the optimizer to: replace or reduce reliance on the first model responsive to an identified aftertreatment fault; replace or reduce reliance on the second model responsive to an identified EGR fault; replace or reduce reliance on the third model responsive to an identified balance valve fault.

Additionally or alternatively, the engine system may further comprise an exhaust manifold pressure sensor, wherein: the optimizer comprises one or more models reliant on a pressure sensed by the exhaust manifold pressure sensor; and the health mitigator is configured, responsive to a fault, to increase reliance by the optimizer on the one or more models reliant on the pressure sensed by the exhaust manifold pressure sensor.

Additionally or alternatively, the engine system may further comprise a turbocharger speed sensor, wherein: the optimizer comprises one or more models reliant on a speed sensed by the turbocharger speed sensor; and the health mitigator is configured, responsive to a fault, to increase reliance by the optimizer on the one or more models reliant on the speed sensed by the turbocharger speed sensor.

This overview is intended to introduce subject matter of the present patent application. It is not intended to provide an exclusive or exhaustive explanation. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 7-9 show illustrative Expert Tables for use in a health monitor.

DETAILED DESCRIPTION

Figure 1:
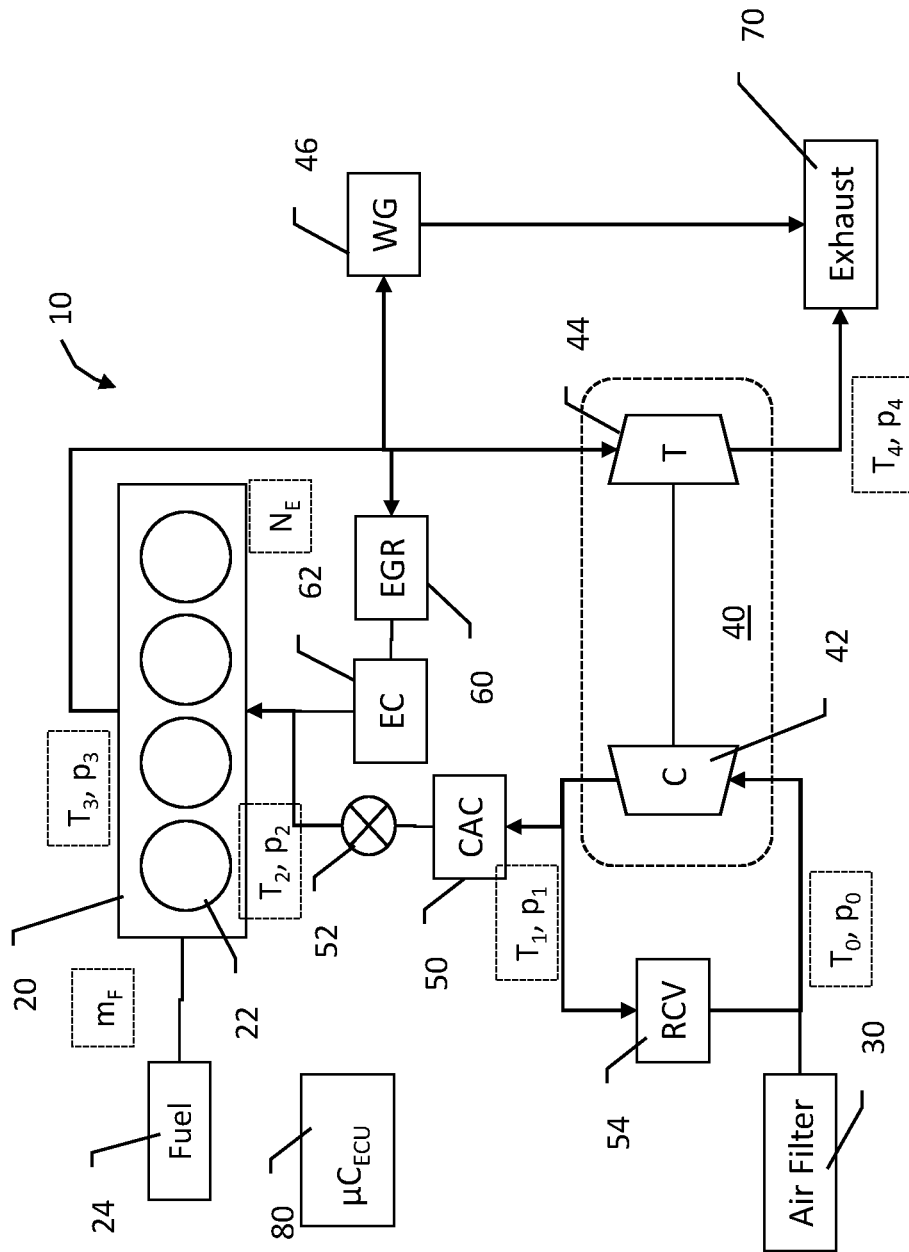
FIG. 1 shows an illustrative engine with a turbocharger.
Figure 2:
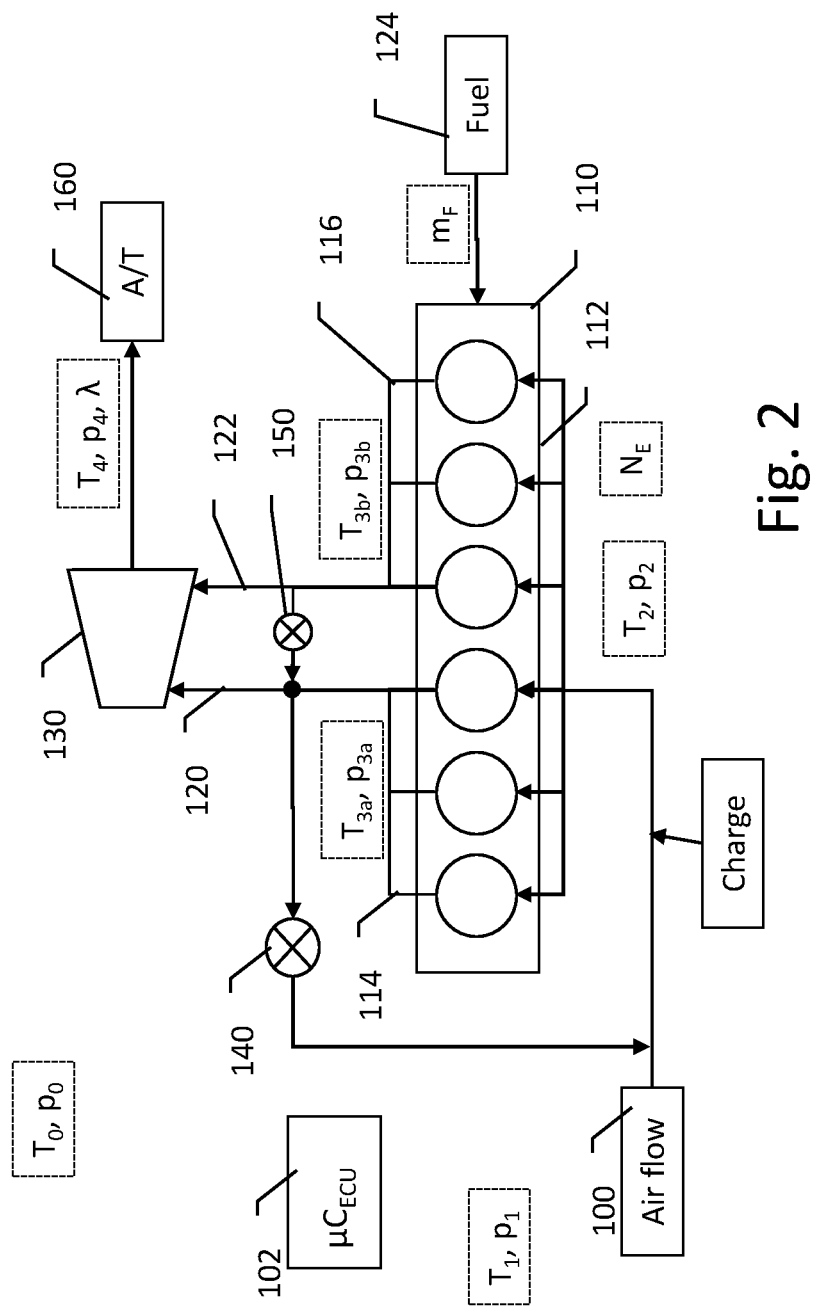
FIG. 2 shows an illustrative engine with a twin scroll turbine.

FIGS. 1 and 2 each show illustrative engine systems on which the present invention may be operated. These examples are shown to aid in the presentation of the operational steps, calculations, and solutions that follow. Other engine systems may be used instead, with different configurations and components as desired.

FIG. 1 shows an illustrative engine with a turbocharger. The system 10 includes an engine 20 having one or more cylinders 22, which receives fuel from a fuel system 24, such as by one or more fuel injectors. The fuel system 24 provides a known or set quantity of fuel for each firing of each cylinder 22, making for a determined quantity of fuel for each full firing sequence of the engine's cylinders. The speed of the engine, $N_E$, represents the speed at which a full firing sequence takes place (whether or not all cylinders are active).

The airflow of the system includes fresh air intake passing through an air filter 30 and then going to a turbocharger 40 having a compressor 42 and turbine 44 linked together by a drive shaft. Air exiting the compressor 42 is considered the "charged" air flow, having been compressed, and it passes through a charge air cooler 50 to reduce temperature, and then to a throttle 52. To prevent turbocharger surge (reverse airflow through the compressor 42 which can be caused by pressure imbalances responsive to closing of the throttle 52), a recirculation valve 54 is provided to allow charged air to recirculate back to the compressor 42 input.

After passing through the throttle 52, the charged fresh air reaches the intake manifold of the engine 20, where combustion takes place. Prior to entering the intake manifold the charged fresh air mixes with recirculated exhaust gasses that pass through an exhaust gas recirculation (EGR) valve 60, which will typically also pass the recirculated gas through an EGR Cooler 62. The recirculated exhaust gas aids in reducing combustion temperatures in the engine 20, reducing certain noxious emissions.

During combustion the charged air mass is combined with the fuel mass, $m_F$. Exhaust gasses leave the engine at an exhaust manifold. Exhaust gasses are then directed to the turbine 44, which obtains torque/force from the exhaust gas that is in turn applied via the drive shaft to the compressor 42. In some examples the speed of rotation of the turbocharger drive shaft is a measured variable, referred to as turbocharger speed.

A wastegate 46 allows venting of exhaust gas without passing through the turbine 44 to control turbocharger speed. Rather than a wastegate 46, a variable geometry turbine (VGT) may be used to manage gasses entering the turbine 44, if desired. Gasses exiting the system either via the turbine 44 or the wastegate 46 go to an exhaust structure 70 where various aftertreatment devices may remove or reduce pollutants. One or more lambda sensors or universal exhaust gas oxygen (UEGO) sensors are provided in the exhaust structure 70. The measured oxygen concentration can be used to determine air to fuel ratio in the engine 20, for example.

Small boxes are shown throughout the figure representing temperature and pressure at various locations:

$T_0$, and $p_0$ represent the ambient air temperature and air pressure $T_1$, and $p_1$ represent pressure and temperature at the outlet of the compressor 42;

$T_2$, and $p_2$ represent pressure and temperature at the intake manifold;

$T_3$, and $p_3$ represent pressure and temperature at the exhaust manifold; and $T_4$, and $p_4$ represent pressure and temperature at the outlet of the turbine 44.

In a production system, the ambient air temperature and pressure ($T_0$, and $p_0$), and the intake manifold pressure and temperature ($T_2$ and $p_2$) may be measured parameters, and other pressures and temperatures are estimated, calculated and or inferred using a model of the system and other characteristics. Engine speed ($N_E$) will also be known, as is the mass input via the fuel injectors of the engine 20, and the output of the lambda sensor at the exhaust structure 70. In some examples, $p_3$ may also be directly measured, and/or the turbocharger speed may be measured.

In a system under test, such as one used for modelling the system or one being tested at a test stand, additional sensors and pressures may be captured throughout the system. The added sensors aid in the development and calibration of models used in production systems to estimate, calculate or infer the various pressures, temperatures, mass flows, etc. as needed.

The operation in general is controlled by an engine control unit (ECU) 80. The ECU may include a microcontroller or microprocessor, as desired, or other logic/memory, application specific integrated circuit (ASIC), etc., with associated memory for storing observed characteristics as well as operational instruction sets in a non-transitory medium, such as a Flash or other memory circuitry. The ECU 80 will be coupled to various actuators throughout the system, as well as to the provided sensors, to obtain data and issue control signals as needed. The ECU may couple to other vehicle control systems such as by a controller area network (CAN) bus or other wired or wireless link.

FIG. 1 illustrates an example which is more or less typical for a diesel engine configuration, with the EGR 60 in a "high pressure" location, recirculating exhaust gasses from the exhaust manifold to the intake manifold of the engine 20. Other fuels and configurations may be used instead. For example, a gasoline engine may use a low pressure EGR 60, which would link the output of the turbine 44 to the input of the compressor 42 using a low pressure EGR valve, or even using a three-way valve taking as inputs the incoming air from the air filter 30 as well as filtered and cooled recirculated exhaust gasses exiting the turbine 44, with an output entering the compressor 42. Additional elements may be present, such as by including an electric motor (E-Turbo) that applies added force as commanded to the drive shaft of the turbocharger 40, and one or more features can be omitted or swapped out, such as by replacing the RCV with a blow-off valve that vents charged air to the atmosphere rather than recirculating it, or any other suitable changes.

FIG. 2 shows an illustrative engine with a twin scroll turbine. One of the known tradeoffs with a standard turbocharger setup as shown in FIG. 1 is that of low-speed responsiveness and high-speed efficiency. When the engine operates at low speeds, the quantity of exhaust gas generated may drive the turbocharger turbine at relatively low speed itself. A command to increase engine speed will cause more exhaust gas to flow, however, the rotational inertia of the turbocharger system components will delay the turbocharger's response. The tradeoff is that one can improve responsiveness using a smaller turbocharger to reduce rotational inertia, but that change can reduce efficiency at high speeds. A twin-scroll turbocharger splits the exhaust gasses and applies a portion of exhaust gasses to a first part of the turbine, and another portion of the exhaust gasses to a different part of the turbine, improving responsiveness at low speeds without sacrificing efficiency at high speeds.

In FIG. 2, air flow is shown coming into the system at 100 (after exiting a compressor, and charge air cooler, as desired), combining with EGR flow and entering the intake manifold for a six-cylinder engine 110 (any number of cylinders may be present; typically, an even number such as 4, 6, or 8). The system components as shown are controlled by one or more ECUs 102. At the exhaust manifold, the exhaust air is split, with some of the cylinder outputs ganged together at 114 and routed via a first exhaust path 120, and the remaining cylinder outputs ganged together at 116 and routed via a second exhaust path 122. The engine receives fuel from a fuel system 124 as before, providing a fuel mass, $m_F$. The first exhaust path 120 is directed to a first portion of the vanes of the turbine 130, and the second exhaust path 122 is directed to a second portion of the vanes of the turbine 130, as illustrated. A balance valve 150 is provided between the two exhaust paths 120, 122, and may be opened and/or closed as needed to balance the exhaust gas flow and/or pressure. Exhaust gasses can then exit the turbine 130, to the aftertreatment 160, as illustrated.

In this example, an EGR valve (high pressure) is shown at 140, recirculating exhaust gasses to mix with the air flow 100. The EGR valve 140 links to the first exhaust path 120, as shown. The balance valve 150 can be used to equalize pressure as needed meaning that not all of the recirculated exhaust would necessarily come from the first exhaust path 120.

The following variables are noted on FIG. 2:

$T_0$, and $p_0$ represent the ambient air temperature and air pressure;

$T_1$, and $p_1$ represent pressure and temperature at the outlet of the compressor (not shown);

$T_2$, and $p_2$ represent pressure and temperature at the intake manifold;

$T_{3a}$, and $p_{3a}$ represent pressure and temperature at the exhaust manifold within the first exhaust path 120; and $T_{3b}$, and $p_{3b}$ represent pressure and temperature at the exhaust manifold within the second exhaust path 122; and $T_4$, and $p_4$ represent pressure and temperature at the outlet of the turbine 44. Lambda sensor output and engine speed $N_E$ are also available variables. The twin scroll configuration incorporates additional mass flow variables (as compared to that of FIG. 1) by spitting the exhaust gas mass flow into two parts, and adding a balance mass flow through valve 150 to the overall analysis/system.

With either of the configurations in FIGS. 1 and 2, EGR mass flow can be measured using, for example, a Venturi-type sensor or an obstruction type flow meter. EGR mass flow could instead by computed by sensing the pressure at the exhaust manifold of the engine and, knowing the pressure differential between the exhaust manifold and the intake manifold, mass flow through the EGR can be calculated using a flow model for the EGR itself. Either sensor type and location (EGR flow sensor/meter, or exhaust manifold pressure sensor) increases system expense and complexity, and the added sensors are subject to failure in the high temperature, dirty environment. Using the exhaust manifold pressure is further complicated due to the inclusion of separate exhaust paths 120, 122 and balance valve 150.

The charge flow, that is the mass entering the intake manifold of the engine, is equal to the air flow (from the compressor) plus the EGR mass flow. The charge flow can be additionally characterized using the burned gas fraction, BGF, which is a function of the air flow, EGR mass flow, and injected fuel mass. BGF has a strong correlation to engine-out oxides of nitrogen (NOx) and is an important control variable.

In each of FIGS. 1 and 2, the EGR mass flow can be estimated and/or calculated without necessarily measuring mass flow through the EGR. For example, a virtual sensor model can infer total air flow throughout the system, with EGR flow then being the difference between air flow entering/exiting the compressor and charge flow into the intake manifold. A lambda sensor in the exhaust airstream, combined with knowledge of the injected fuel quantity, can be used to infer the EGR mass flow after solving for charge flow and air flow. With lean combustion, however, the lambda sensor is generally less accurate than would be desired, and the data provided by a lambda sensor is subject to delay. A virtual sensor model may be inaccurate when pressure ratios are low, due to reliance on pressure differences from one location to another in the system for calculating flow rates.

In some illustrative examples, the EGR mass flow is determined using a weighted combination of a virtual sensor and the lambda sensor. The weighted combination may use weighting coefficients that are dynamically modified in response to engine conditions. For example, with lean combustion and/or in transient conditions, weighting coefficients can be selected to favor the virtual sensor model. When pressure ratios calculated by the virtual sensor are low, the weighting coefficients can be selected to favor use of the lambda sensor. For example, when one factor or the other is "favored," the weighting coefficients can be selected so that the favored factor is the predominant input (greater than 50%, 75%, or 90% for example) of the resultant calculation.

The mass flows in the illustrative system of FIG. 2 can be modelled using a limited set of equations. Each variable/model can be formulated using a multivariate polynomial of the form:

$$P(u_1, u_2) = a_0 + a_1 \cdot u_1 + a_2 \cdot u_2 + a_3 \cdot u_1^2 + a_4 \cdot u_1 \cdot u_2 + a_4 \cdot u_2^2 \quad \{1\}$$

Third or more variables may be included, with expansion of similar structure. The models may also include or use a set of rational functions of a form:

$$R(u_1, u_2) = \frac{N(u_1, u_2)}{D(u_1, u_2)} \quad \{2\}$$

Where $N(u_1, u_2)$ and $D(u_1, u_2)$ are each polynomials of the form shown in Eq. 1. By generating each model as a multivariate and/or rational function as shown in Eq. 1 and Eq. 2, the underlying derivations and calculations will remain rational and can be accurately approximated with unbounded sensitivities. The analytical framework allows fast evaluation of the models and sensitivities. Within such models, error functions can be set to detect and handle any circumstance in which the denominators near zero.

The mass flows for a twin scroll design, as in FIG. 2, can be calculated using the following equations. The aftertreatment (AFT) mass flow is as shown in Equation 3:

$$m_{T1}(p_{3a}, p_4, T_{3a}) + m_{T2}(p_{3b}, p_4, T_{3b}) = m_{AFT}(p_4, p_0, T_4) \quad \{3\}$$

Where $m_{T1}$ and $m_{T2}$ represent mass flow into each scroll of the turbine, and $m_{AFT}$ is the exhaust/aftertreatment mass flow. The flow balance for Scroll 1 is as shown in Equation 4:

$$m_{T1}(p_{3a}, p_4, T_{3a}) + m_{EGR}(p_{3a}, p_2, T_{3a}, u_{EGR}) + \\ m_{Bal}(p_{3a}, p_{3b}, T_{3a}, u_{Bal}) = \frac{1}{2}(m_{Ch}(p_2, m_f, T_2, N_e) + m_F) \quad \{4\}$$

Where $m_{EGR}$ is the EGR mass flow, $m_{Bal}$ is the mass flow through the balance valve, $m_{Ch}$ is the charge mass air flow, and $m_F$ is the fuel mass. The flow balance for Scroll 2 is shown by Equation 5:

$$m_{T2}(p_{3b}, p_4, T_{3b}) - m_{Bal}(p_{3a}, p_{3b}, T_{3a}, u_{Bal}) = \\ \frac{1}{2}(m_{Ch}(p_2, m_f, T_2, N_e) + m_F) \quad \{5\}$$

The pressures $p_{3a}$, $p_{3b}$, and $p_4$ may be found by an iterative solver, such as a Gauss-Newton, Newton-Raphson, or iterated Kalman Filter. An exhaust manifold pressure sensor is optional in these equations. When the exhaust manifold pressure sensor is present, Equation 6 can be used as further discussed below in mitigation of one or more failure modes:

$$p_{3a} = p_{3a\_sensor} \quad \{6\}$$

Because the system state can be solved without the exhaust manifold sensor, the inclusion of such a sensor can be used for the mitigations described below.

The total mass of incoming air flow ($m_A$) into the system can be determined using Equation 7:

$$m_A = m_{T1}(p_{3a}, p_4, T_{3a}) + m_{T2}(p_{3b}, p_4, T_{3b}) - m_F \quad \{7\}$$

Or, alternatively as shown in Equation 8:

$$m_A = m_{AFT}(p_4, p_0, T_{3a}) - m_F \quad \{8\}$$

And the EGR mass flow would then be as shown in Equation 9:

$$m_{EGR} = m_{Ch}(p_2, m_F, T_2, N_e) - m_A \quad \{9\}$$

The equations are somewhat simpler with a single scroll turbine. The turbine outlet flow balance can be understood from Equation 10:

$$m_T(p_3, p_4, T_3, u_T) = m_{AFT}(p_0, p_4, T_4) \quad \{10\}$$

Where $u_T$, now included in the equation, is a turbine flow controlling actuator position, such as the wastegate or a variable geometry turbine (VGT). The mass flow balance can be understood from Equation 11:

$$m_T(p_3, p_4, T_3, u_T) + m_{EGR}(p_2, p_3, T_3, u_{EGR}) = m_{Ch}(p_2, m_F, T_2, N_e) + m_F \quad \{11\}$$

If desired, the charge mass may also be calculated with the inclusion of measured $p_3$ (to the extent it is available) as one of the parameters. Again, pressure $p_3$ and $p_4$ are found by an iterative solver, such as a Gauss-Newton, Newton-Raphson, or iterated Kalman Filter. The exhaust manifold pressure sensor is optional in these equations. Inclusion of the $p_3$ sensor can be used for fault identification and/or mitigation, using Equation 12:

$$p_3 = p_{3\_sensor} \quad \{12\}$$

The incoming air flow can be calculated for the single scroll turbine using Equation 13 or 14:

$$m_A = m_T(p_3, p_4, T_3, u_{Trb}) - m_F \quad \{13\}$$

Or, alternatively:

$$m_A = m_{AFT}(p_4, p_0, T_3) - m_F \quad \{14\}$$

And the EGR mass flow is again the same as in Equation 9, above.

The data extraction for the twin-scroll turbine model, and particularly with reference to the balance valve flow, will depend on accuracy of turbine flow mapping, EGR valve modelling, and the charge flow model. With that many inputs, the data output can be uncertain. In some examples, the exhaust pressure measurement (if available) can be used to directly estimate the mass flow through the balance valve. In other examples, assuming again that exhaust pressure measurement is available, the turbine mass fraction flow for each scroll may instead be estimated. Using the exhaust pressure measurement either way will reduce the uncertainty of the model, specifically that of the balance mass flow, $m_{Bal}(p_{3a}, p_{3b}, T_{3a}, u_{Bal})$. This substitution may be particularly useful when a fault is identified. More particularly, if a fault is identified with the balance valve, models relying on the balance valve become unreliable, and a mitigation can be to switch to a modified analysis that omits the balance valve model, which both equations 4 and 5 above rely upon, as discussed below.

For example, mass balance equations can be used to resolve the mass flow as follows. The turbine outlet flow balance can be expressed as:

$$m_{T1}(p_{3a}, p_4, T_{3a}) + m_{T2}(p_{3b}, p_4, T_{3b}) - m_{AFT}(p_4, p_0, T_4) = 0 \quad \{15\}$$

The flow balance on scroll 1 can expressed as:

$$m_{T1}(p_{3a}, p_4, T_{3a}) + m_{EGR}(p_{3a}, p_2, T_{3a}, U_{EGR}) + \\ m_{Bal} - \frac{1}{2}(m_{Ch}(p_2, m_F, T_2, N_e) + m_F) = 0 \quad \{16\}$$

The flow balance on scroll 2 can be expressed as:

$$m_{T2}(P_{3b}, P_4, T_{3b}) - m_{Bal} - \frac{1}{2}(m_{Ch}(p_2, m_F, T_2, N_e) + m_F) = 0 \quad \{17\}$$

In Equations 16 and 17, $m_{Bal}$ is treated as a freely estimated signal, rather than being modelled as above in Equations 4 and 5. Pressure sensor information can be expressed as:

$$p_{3a} = p_{3a\_sensor} \quad \{18\}$$

The augmented vector can then be expressed as $p_{3a}$, $p_{3b}$, $p_4$, $m_{Bal}$.

As an alternative, the system can start with the turbine outlet and aftertreatment (AFT) flow balance:

$$m_T(p_{3a}, p_{3b}, p_4, T_{3a}, T_{3b}, T_4) - m_{AFT}(p_4, p_0, T_4) = 0 \quad \{19\}$$

The balance on scroll 1 is then:

$$(1-\beta) * m_T(p_{3a}, p_{3b}, p_4, T_{3a}, T_{3b}, T_4) + \quad \{20\}$$
$$m_{EGR}(p_{3a}, p_2, T_{3a}, u_{EGR}) - \frac{1}{2}(m_{Ch}(p_2, m_F, T_2, N_E) + m_F) = 0$$

Where $\beta$ indicates the fraction of the total exhaust passing through scroll 1. As represented in Equation 20, the mass flow through scroll 1, plus the EGR mass flow, equals one half of the mass exiting the exhaust manifold of the engine, and is adjusted for balance valve flow using $\beta$. The scroll 2 flow balance is shown in Equation 21:

$$\beta * m_T(p_{3a}, p_{3b}, p_4, T_{3a}, T_{3b}, T_4) - \frac{1}{2}(m_{Ch}(p_2, m_F, T_2, N_E) + m_F) = 0 \quad \{21\}$$

The resulting augmented vector can be expressed as $p_{3a}$, $p_{3b}$, $p_4$, $\beta$. Equations 6 and 7 can be used again to characterize the mass balance; optionally, Equation 7 can be consolidated to reduce the turbine mass flow to a single function expressed as $m_T(p_{3a}, p_{3b}, p_4, T_{3a}, T_{3b}, T_4)$ if desired. The EGR mass flow equation can then be modified to use $\beta$ as shown in Equation 22:

$$m_{EGR} = \frac{1}{2}(m_{Ch}(p_2, m_f, T_2, N_e) + m_F) - \quad \{22\}$$
$$(1-\beta) * (m_T(p_{3a}, p_{3b}, p_4, T_{3a}, T_{3b}, T_4))$$

The set of equations and variables shown above illustrates the air flow model that can be iteratively solved on an ongoing basis to calculate various pressures, temperatures and air flow in an engine system. The analysis may be referred to as a virtual sensor insofar as several temperatures, pressures and air flow in the system are calculated, rather than being sensed or measured, with the output of the calculations serving as a "virtual" sensor. Test stand operations and other suitable calibrations may be performed to create and/or update coefficients within the airflow model. For example, as components age or are replaced, the model may be rebuilt at a test station and/or the model may be adjusted over time to accommodate aging. For example, a system health monitor may be used to calculate model changes related to component aging, such as by using a function of time, a function of usage, or through measurement or virtual monitoring of changing performance/operation of various components.

An air flow fusion is then used to calculate the air flow. There are two sources: air flow computed from the (filtered) equivalence ratio, which relies on the lambda sensor, and mass balance from the mass flow solver shown above. The lambda sensor is most accurate in steady state, and when the exhaust has a relatively low oxygen content (such as less than 10% oxygen). On the other hand, the mass balance and flow solver are less accurate when the delta between pia and $p_{3b}$ is small.

The lambda relationship is shown in Equation 23:

$$\lambda = \frac{1}{AFR_{stoich}} \cdot \frac{m_A^{\lambda}}{m_F}. \quad \{23\}$$

As can be seen, the output of the lambda or air-fuel ratio (AFR) sensor will be the mass of the air flow, divided by the mass of fuel, times the inverse of the stoichiometric ratio for the relevant fuel. Rearranging Equation 23, $m_A^{\lambda}$, equals the product of the lambda sensor output, fuel mass, and the stoichiometric ratio for the relevant fuel.

In some examples, air flow fusion can be calculated using a weighted average such as shown in Equation 24, where the value of $m_A$ is determined such that the magnitude of the vector using the two weighting values is minimized:

$$\min_{m_A} \left\| \begin{array}{c} w_1 \cdot (m_A^{\lambda} - m_A) \\ w_2 \cdot (m_A^{T,EGR,Aft} - m_A) \end{array} \right\|^2 \quad \{24\}$$

Where the two weights $w_1$ and $w_2$ are each functions of other variables. For example, $w_1$ may be function of the lambda sensor output, as by reducing it in linear fashion from a nominal value to zero as the oxygen content goes from 10% to 5% oxygen (or other function through a similar, wider, or narrower range of oxygen values). If the lambda sensor status is false (such as due to component failure or transient operation), $w_1$ may be set to zero. The other weight, $w_2$, may be a function of the difference between pia and $p_{3b}$ as calculated in the pressure model of the system; that is, $w_2$ may drop from a nominal value to zero over a range as the difference between pia and $p_{3b}$ drops below a preset threshold. These constraints on the weighting values may be omitted in some examples.

Figure 3:
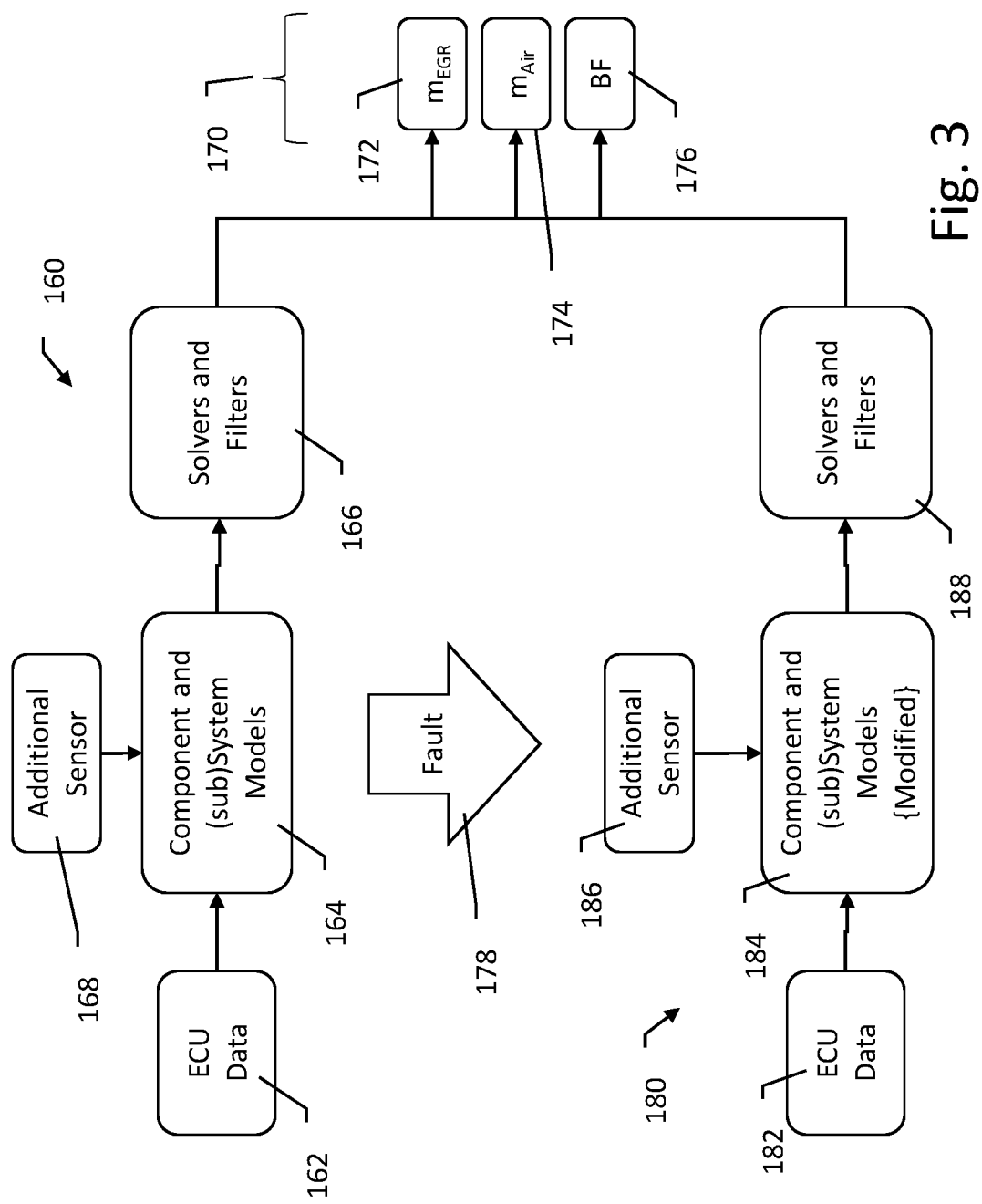
FIG. 3 shows an illustrative example of a system responsive to a fault.

FIG. 3 shows an illustrative example of a fault mitigation approach. A nominal operating mode is illustrated at 160. A set of ECU data 162 is provided to a collection of component and sub-system or system models at 164. Component models can be generated for individual componentry of the system. An example may be, for example and without limitation, a model of the flow characteristics in any of the system components such as the compressor, air coolers, EGR valve, wastegate, turbine, and engine, as well as associated linking components therebetween. Such models may be determined on an isolated basis for each component, or may be modeled for subsystem and/or system operation. The preceding discussion of various flow equations provides a detailed sequence and set of examples. The ECU data from 162 is provided to the models, resulting in a set of equations that can be solved using suitable analytical tools as indicated at 166. Any of the above noted solvers and filters may be used for providing a multivariable analysis and non-linear (or linear, as the case may be) analysis performed by the ECU and/or dedicated processors and circuitry to calculate a set of outputs indicated at 170. The illustrative outputs include the EGR valve mass flow 172, the mass air flow 174, and the burned fuel fraction 176.

Additional sensors 168 can be used to augment the analysis as described above where, for example, the normal operation models 164 and/or solvers 166 are capable of generated the outputs at 170 without the "additional" sensors. An example from the above discussion is the exhaust manifold pressure sensor, which may serve as the additional sensor 168, which does not need to be used in the ordinary analysis. The additional sensor(s) 168 can be used as a substitute for an identified faulty component when mitigating the fault.

In the illustrative example, a fault is then identified at indicated at 178, and the system switches to using a different analysis, with the newly implemented analysis 180 configured specifically to the fault 178. A fault may be identified using a bottom-up approach, looking directly at individual actuators or components or at parameters affected by the individual actuator or component. For example, a stuck or blocked EGR valve can be identified by determining that the EGR valve fails to actuate responsive to a control signal, whether by observation of the valve actuator itself, or by observing a failure of system parameters to change in response to attempted EGR valve actuation. A blocked aftertreatment (AFT) may be identified due to failure of the AFT-related sensors to change values, or an out of range sensor output. A blocked or stuck balance valve may be identified similar to the EGR valve, that is, by directed observation of the actuator failing to respond to a control signal change, or by failure of system parameters to change when the balance valve is actuated.

In some examples fault isolation is performed as a second part to a broader process that takes a more top-down approach. First, an analysis is performed to determine whether a fault has occurred and, if so, then fault isolation is performed as shown in the analysis starting with FIG. 4, below.

Mitigation can be performed in various ways. For example, if the fault identified is a blocked aftertreatment (AFT), a model relying on AFT sensing can be omitted. Using reference to the above numbered equations, Equations 3 (twin scroll turbine) or 10 (single scroll turbine) may be omitted from the set of equations and models used, as those equations rely on the model for aftertreatment flow which is no longer reliable due to the fault. The additional sensor value, such as the exhaust manifold pressure, can be provided to the set of equations instead.

If the fault identified relates to the EGR being blocked or stuck, a model relying on the EGR can be omitted or substituted. Using reference to the above numbered equations, Equations 4 (twin scroll turbine) or 11 (single scroll turbine) may be omitted. The additional sensor value, such as the exhaust manifold pressure, can be provided to the set of equations instead.

If the balance valve of a twin scroll turbine implementation is blocked or stuck, an augmented formulation for computing the mass flows can be implemented. With a twin scroll turbine, Equations 15-18 may be illustratively used and take the place of equations 3-5, with the exhaust manifold pressure, as sensed, incorporated into the analysis as pia. Using $p_{3a}$ allows calculation of the EGR mass flow, which in turn resolves the charge air flow into the engine. Including $m_{Bal}$ as a freely estimated variable facilitates the analysis of Equations 15-18, having a set of four equations with four unknowns ($p_{3a}$, $p_{3b}$, $p_4$ and $m_{Bal}$). Another approach is to use β to represent the fraction of the total exhaust passing through scroll 1, as shown in Equations 19-22, resulting in a set of four equations with four unknowns ($p_{3a}$, $p_{3b}$, $p_4$ and β).

In still another example with the balance valve blocked or stuck, each of an exhaust manifold pressure ($p_{3a}$) and the intake manifold pressure, $p_2$, may be used to calculate the air mass flow using equation 25:

$$m_A = m_{Ch}(p_2, m_f, T_2, N_e) - m_{EGR}(p_{3a}, p_2, T_3, u_{EGR}) \quad \{25\}$$

Thus, here, the charge blow model and EGR valve model flow, both of which can be fed by direct measurement of $p_{3a}$ and $p_2$ are used to characterize the mass flow.

The mitigations described above are intended to be illustrative. Other mitigations may be used instead. In some embodiments, it is sufficient that, responsive to an identified fault, one or more analytical models used to calculate airflow in the engine system is underweighted or omitted. Instead of the underweighted or omitted analytical model, a sensed parameter that is not relied upon during the ordinary operation is integrated into the analysis. In some examples, the "not used" sensor may be used for fault identification, if desired.

In another alternative approach, rather than an exhaust manifold pressure sensor, the additional sensor 186 may be the turbocharger speed, which provides both turbine and compressor speeds. Using a turbocharger model and the torque balance on the turbocharger shaft, the analysis can determine the charge air mass flow as well as the exhaust mass flow (taking into account the effect of VGT or WG operation), and the iterative solver can again reduce the problem formulation to four equations and four unknowns.

The newly implemented analysis integrates the "additional" sensor 186 into the analysis, such as by changing the weighting applied to a plurality of models, or by replacing one model with another in the analysis. ECU data 182 is provided to the modified set of component and system/subsystem models 184, which also uses the additional sensor data 186. The resulting set of equations is submitted to the solvers and filters at 188 to again provide the same set of outputs 170 as before. The result is that the response to the fault 178 provides the set of system data 170 that allows continued operation of the system even after the fault is identified. It may be that the system operation is ultimately limited in some sense, or less optimized than before, but the system in some examples remains operational within defined limits to avoid the need for complete shutdown due to, for example, violation of emissions or other requirements. That is, with the set of output system data 170 still available after the fault 178, the overall control needed for continued operation within operating limits remains possible until the fault 178 can be resolved in, for example, a subsequent maintenance activity.

The modified analysis can take several forms. In some examples, a set of weighting values are used to determine which of the available analyses are predominant in the system state calculations. Rather than omitting an equation from the analysis, some examples swap new weighting values into the analysis to minimize the impact of one or more models on the outcome analysis. For example, with an Iterated Kalman Filter (IKF) solver, the tuning matrix or measurement covariance matrix can be adjusted to apply large gains to those models that are deemed unreliable, effectively reducing the impact of such models on the output. For other solvers, the weight values can be reduced instead. The effect can be to underweight or effectively omit, for purposes of the solvers being used in a particular implementation, those models that become unreliable due to the identified fault.

While the specific manner of implementing the change is dependent on the type of solver used, the aim is to minimize the impact of a model which, due to an identified fault 178, is no longer reliable, on the analytical outputs 170. Rather than implementing a different solver, or loading an entirely new analysis matrix to the solver, swapping in a new set of gains or weights responsive to the identified fault is used as the mitigation in some examples. Other examples may switch to a different solver, or may reload a distinct set of equations to the solver in place of those previously used, if desired, as mitigation for the fault 178. When the solver is switched, or the equations are swapped, the effect can be to omit, for purpose of the solvers being used in a particular implementation, those models that become unreliable due to the identified fault.

If, at a later time, it is determined that the fault causing a model to become unreliable has ceased (i.e., a stuck valve becomes unstuck, or a blockage of a valve or other component is cleared), the system may revert to the original normal operation described above.

Figure 4:
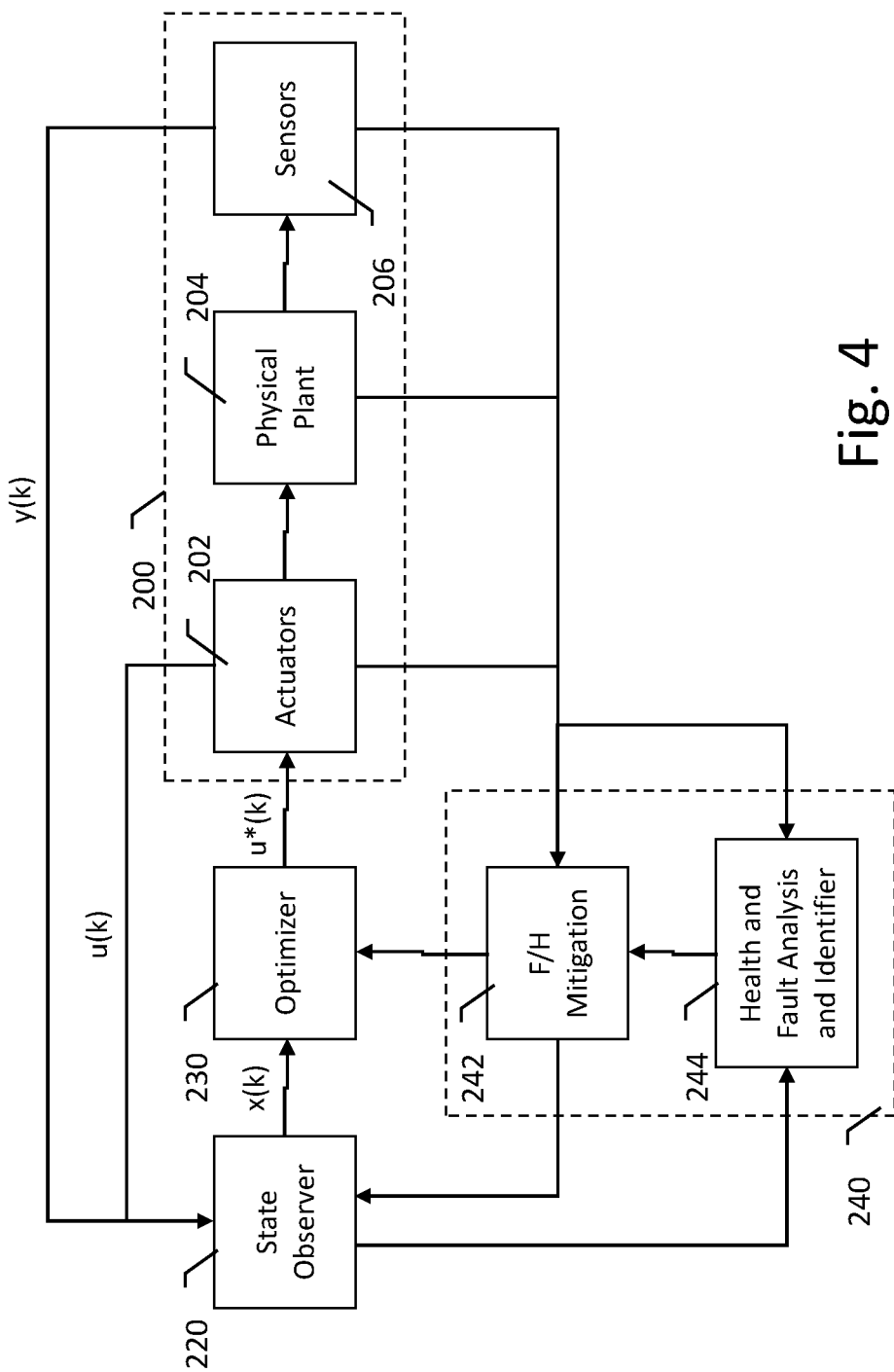
FIG. 4 shows an illustrative control system and physical plant.

FIG. 4 illustrates a system and control configuration. A control system operates on an underlying system 200 comprising a set of actuators 202 operating on a physical plant 204. The physical plant is observed using a set of sensors 206.

A control apparatus as shown in this example includes a state observer 220, which feeds a set of current state variables x(k) to an optimizer 230. The optimizer 230 calculates a solution for process parameters that can be applied to a set of actuators 202, which in turn control operation of the physical plant 204. The set of actuators 202 may apply to control, for example and without limitation, fuel or other injectors, variable nozzle turbine position, throttle valve, engine brake, after-treatment (including exhaust), exhaust gas recirculation (EGR), turbocharger, an electric motor (in an electric turbocharger for example, which may be controlled via pulse width modulation (PWM)), the waste gate (WG) actuator position (stroke), position of a recirculation valve actuator, position of the variable compressor geometry actuator; and combinations thereof.

The physical plant 204 may be, for example and without limitation, an internal combustion engine, whether diesel or gasoline, or a subsystem thereof, such as a turbocharger, the system airpath as a whole, catalysts, etc. Illustrative and non-limiting examples of a physical plant 204 and associated actuators 202 and sensors 206 are shown above in FIGS. 1 and 2, for example. The present invention may also be used more broadly in other systems outside of the engine or vehicle context.

In some examples, sensors 206 may include, for example, and without limitation, sensors detecting manifold absolute pressure (MAP), mass air flow (MAF), EGR flow, turbo speed, NOx, engine speed, fuel quantity, boost pressure, etc. Additional monitored parameters may include, for example, torque output of the electric motor of an electric turbocharger, waste gate (WG) normalized opening, recirculation valve (RCV) normalized opening, and/or a variable geometry compressor configuration. Such sensors may be configured to sample the underlying parameter being sensed and provide the result of such samples to the state observer 220. The state observer 220 may record the underlying sensed parameters, as well as actuator positions, over time to provide history of the system operation.

The state observer 220 and optimizer 230 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 202 and/or sensors 2066, which in turn may be read periodically by a microcontroller configured with stored instruction sets for performing a control and/or optimization calculation using, for example, model predictive control (MPC) cost functions, linear quadratic regulator (LQR) control, proportional integral derivative (PID) control, or other control algorithms. The optimizer 230 may be integrated into, or provided separately from, an on-board diagnostics system (not shown) that can be used to record diagnostic variables and present them, as needed to the user or to store for later analysis, both of which may additionally be integrated, if desired, into the overall vehicle processing unit.

The output of the optimizer 230 is used to control the actuators 202 to operate the plant in a manner to minimize the distance of operating parameters from one or more target output values for the controllable outputs or physical plant operating characteristics. For example, the targets may be any of target turbocharger speed, target boost pressure, target pressure difference over the compressor, target air mass flow or a combination thereof. For example, with MPC functions, the distance to target or reference values for the one or more output values (or resulting operating characteristics) is minimized, thus optimizing performance. As an example, a traditional MPC cost function formation may be as shown in Equation 26:

$$J_{MPC} = \min \Sigma_{k=1}^{P} \|y_{r,k} - y_k\|_{W_1} + \|u_{d,k} - u_k\|_{W_2}, \qquad \text{Eq. [26]}$$

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ represents output reference values, and $y_k$ represents predicted values provided according to mathematical modelling of the physical plant to be controlled during the relevant time horizon, while and $W_1$ and $W_2$ specify weighting terms. For simplicity the k terms may be omitted in subsequent equations herein. The traditional MPC cost function is minimized in operation in order to provide optimal control to the physical plant 204. Such a process may be performed by the optimizer 230.

In another example, a PID controller can be used to account for each of proportional, integral, and derivative differences from a target operating point. The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 202 are, for a PID controller, adjusted to reduce or minimize the distance of actual performance from one or more targets on an iterative basis. The optimizer 230 may use PID control instead of MPC, for example. LQR control may be used instead, if desired, applying similar concepts.

The system shown in FIG. 4 further comprises a health monitor 240, configured to receive information from the sensors 206, physical plant 204, and/or actuators 202, as well as the state observer 220. Received information may, for example, reflect a current state (for example, whether and to what extent a valve is open), though such information from the actuators may instead or in addition be obtained by monitoring control signals from the optimizer 230 to the actuators 202, as desired.

Block 240 is shown for illustrative purposes but may be understood as being integrated into the optimizer 230. The operations of blocks 220, 230, 240 may be implemented in a microcontroller configured to operate on a set of stored instructions for performing a state observation, health management and optimization routine. In another example, each of blocks 220, 230, 240 may be performed by separate microcontrollers or application specific integrated circuits (ASIC).

The health monitor 240 is shown in FIG. 4 as including each of a fault or health degradation mitigator 242, and a health and fault analysis block 244. In an example, the health and fault analysis block 244 uses received data to determine whether health degradation or component fault are occurring. For purposes of the following discussion, health degradation and component fault may each be considered a "fault" to the extent that either is identified as occurring according to a change analysis block further described below. The fault and health mitigation block 242 responds to an output of block 244 to apply a mitigation to the system. In some examples, a mitigation is applied by modifying the operation of the optimizer. For example, weighting values or models used in the optimizer may be modified, or data within models used by the optimizer may be modified, as explained in U.S. patent application Ser. No. 17/008,076, filed Aug. 31, 2020, and titled HEALTH CONSCIOUS CONTROLLER, as well as U.S. patent application Ser. No. 17/327,066, filed May 21, 2021, and titled ENGINE MASS FLOW OBSERVER WITH FAULT MITIGATION, the disclosures of which are incorporated herein by reference.

The aim overall in some examples is to determine whether the state observer and/or optimizer are performing with models that correspond to reality. If not, the accuracy of estimated states can be jeopardized, and the ability of an optimizer model to calculate an optimal solution may be impaired. For example, the state observer may have a health-based reconfiguration functionality, in which observer tuning parameters can be switched (i.e., a hard switch, replacing one model with another entirely or swapping out one set of tuning parameters for another), or a continuous retuning can be performed responsive to gradient changes of the underlying component and/or system health. In an example, the state observer may rely on, for example and without limitation, a Kalman filter, and the associated measurement error covariance of the Kalman filter can be retuned and/or adjusted to account for changes in system health or the presence of a fault. An optimizer may use multiple models and/or weighting values as well, which can be hard switched or subjected to incremental changes over time in response to changes in component health/performance. In still another example, an optimizer may be configured to use a plurality of different models and fuse outputs using a weighting matrix; when a fault arises that makes one of the plurality of models unreliable, the fusion or weighting matrix can be adjusted to eliminate or reduce the influence of the unreliable model.

Figure 5:
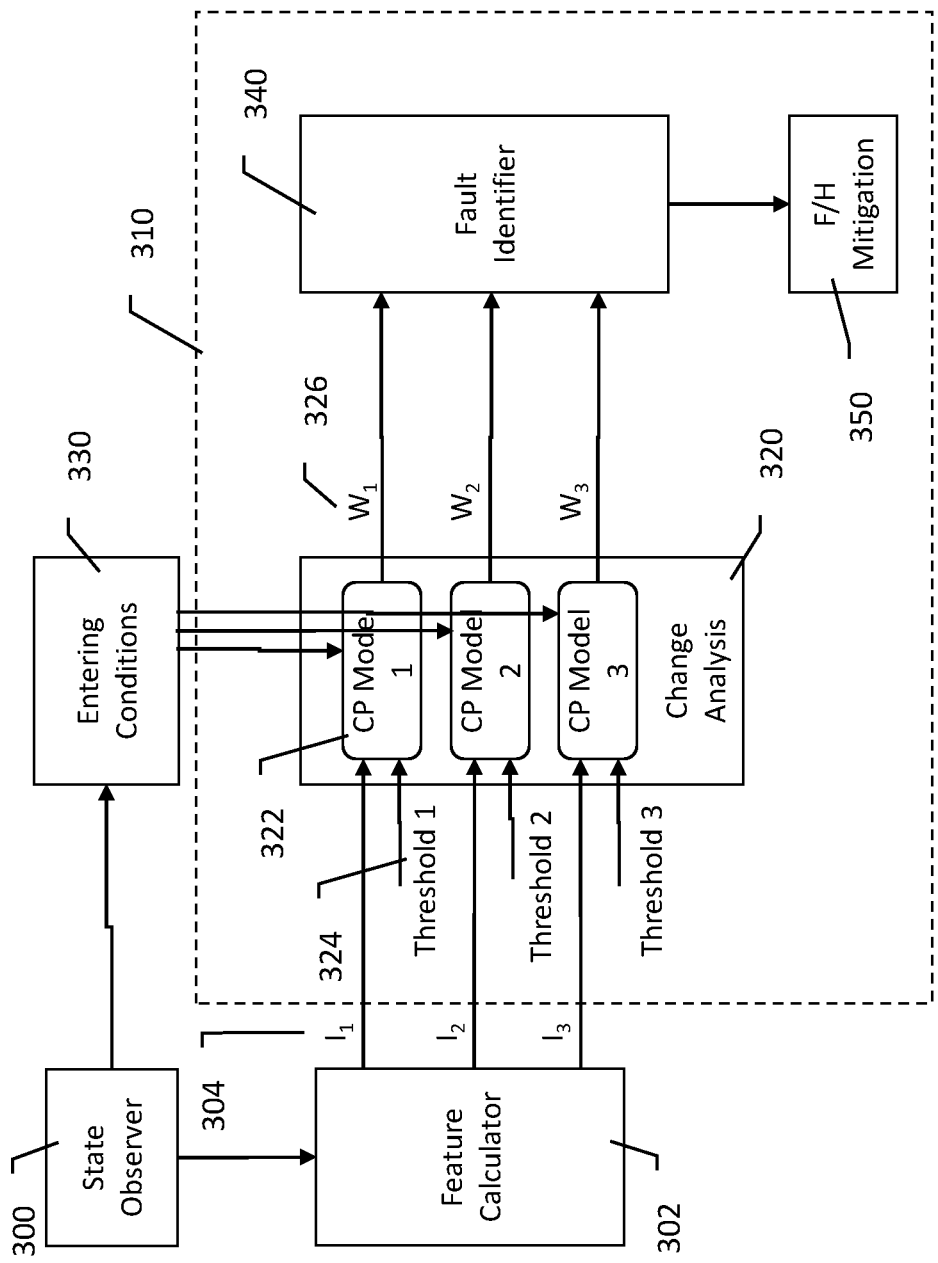
FIG. 5 shows in block form an illustrative health monitor.

FIG. 5 shows an illustrative health monitor 310 that may be used as element 240 of FIG. 4. The health and fault analysis block 244 of FIG. 4 is expanded here to include two main components: a change analysis block 320 and a fault identifier 340. In the example, the state observer 300 (which may serve also as block 220 in FIG. 4) is used to capture the current state of the controlled system, which may be an engine system. A feature calculator 302 generates a plurality of feature indicators 304 $I_1$, $I_2$, and $I_3$, based on the current state or stored historical states of the system as obtained from the state observer 300 and/or direct sensor measurements. The feature indicators 304 are provided to the change analysis block 320. While three feature indicators are shown in this example, any number (1 to dozens or hundreds) of feature indicators may be provided.

Each feature indicator 304 is processed, and the processed value is later compared to a corresponding threshold by the change analysis block 320, subject to a set of entering conditions 330. A set of change probability models 322 is used to determine whether a change has taken place, thereby triggering the fault identifier 340 and subsequent mitigation 350. In the illustrative example shown, the set of entering conditions 330 is used to enable or disable change analysis for each of the change probability models and associated feature indicators 304. Entering conditions 330 may be provided to ensure that the analysis is performed on useful data. Before explaining the entering conditions 330, a set of feature indicators 304 and associated change analysis 320 will be detailed.

In an illustrative example, a set of feature indicators 304 may be as shown in Feature Set 1:

$$I_1 = \frac{m_{A,EGRv} - m_{A,\lambda} - \mu_{\Delta 1}}{\sigma_{\Delta 1}}$$ {Feature Set 1}

$$I_2 = \frac{p_{3a}^{sens} - p_{3a} - \mu_{\Delta 2}}{\sigma_{\Delta 2}}$$

$$I_3 = \frac{p_{4,nom} - p_4 - \mu_{\Delta 3}}{\sigma_{\Delta 3}}$$

Wherein, for $I_1$, $m_{A,EGRv}$ is the airflow computed as the charge flow minus the EGR valve flow as calculated using an EGR valve model, $m_{A,\lambda}$ is the airflow computed using a model based on the lambda sensor output, $\mu_{A1}$ is a mean difference between the two airflows under nominal conditions, and $\sigma_{A1}$ is the standard deviation of the difference between the two airflows under nominal conditions. For $I_2$, $p_{3a}^{sens}$ is the measured pressure observed by an exhaust manifold pressure sensor, $p_{3a}$ is the solved exhaust pressure from the balance flow (for a twin scroll turbine, in this example), and $\mu_{A2}$ is a mean difference between the two pressures under nominal conditions, and $\sigma_{A2}$ is the standard deviation of the difference between the two pressures under nominal conditions. For $I_3$, $p_{4,nom}$ is a modeled pressure downstream of the turbine calibrated under nominal healthy conditions, p4 is the solved downstream turbine pressure from the balance flow, $\mu_{A3}$ is a mean difference between the two pressures under nominal conditions, and $\sigma_{A2}$ is the standard deviation of the difference between the two pressures under nominal conditions.

Based on the preceding paragraph's description of the feature parameters, the entering conditions may be as follows:

For a change probability model applicable to $I_1$, the entering conditions may be, for example and without limitation, a set minimum EGR mass flow (such as greater than 0.3 kg/s, for example and without limitation), a fuel mass that is greater than zero, and that the lambda sensor is ON/active.

For the change probability model applicable to $I_2$, the entering condition may be, for example, that the absolute value of the difference between $p_{3a}^{sens}$ and $p_{3a}$ is below a threshold (such as, for example and without limitation, 20 kPa).

For the change probability model applicable to $I_3$, the entering condition may be, for example, that the absolute value of the difference between $p_{4,nom}$ and $p_4$ is below a threshold (such as, for example and without limitation, 2.5 kPa).

The numerical limitations noted are illustrative for one example; other values may apply to different implementations. As can be seen, the entering conditions prevent the change analysis from being performed in aberrant or unreliable conditions. For example, the change conditions when analyzing mass flow may not apply in the absence of a valid lambda sensor output (sensor off), or when no fuel flow or EGR flow is present (as each would make one of the underlying models unreliable). Likewise, highly transient conditions (as may cause large deltas in the pressure values) may be excluded from the analysis for $I_2$ and $I_3$. The entering conditions block 330 provides an enabling or disabling signal to each of the individual change analysis blocks 322 depending on whether the corresponding entering condition is met. The entering conditions illustrated above are specific to one example, and different thresholds, analyses, or types of entering conditions may be used in other implementations.

Each change analysis block 322, in this example, generates a continuous probability $W_1$, $W_2$, $W_3$ about the change of the corresponding feature input $I_1$, $I_2$, $I_3$. The individual outputs $W_1$, $W_2$, $W_3$ may represent probabilities of selected conditions, which the fault identifier 340 can then use to determine whether a particular component is in a fault or unhealthy condition. These continuous probabilities $W_1$, $W_2$, $W_3$ may be scaled or normalized to an interval of 0 and 1 in some examples; scaling or normalization may take place in any suitable fashion or may be omitted. In an alternative approach, each of $W_1$, $W_2$, $W_3$ may provide a Boolean indicator (0 or 1; True or False, for example) of a particular condition. In an example, using the definitions for $I_1$, $I_2$, and $I_3$ in Feature Set 1, the outputs $W_1$, $W_2$, $W_3$ can indicate whether, for $W_1$, the airflow calculated using the EGR valve model is equal to the airflow as calculated using a Lambda sensor output; $W_2$ can indicate whether the sensed exhaust manifold pressure is equal to a calculated/modeled exhaust manifold pressure, and $W_3$ can indicate whether a modeled pressure downstream of the turbine calibrated under nominal healthy conditions is equal to the solved downstream turbine pressure from the balance flow (in a twin scroll turbocharger configuration).

Other features/conditions may be used, as desired, and any suitable number of features may be tested/applied. For example, additional inequality conditions may determine whether a sensed turbocharger speed is equal to a modeled turbocharger speed, whether an airflow sensed using an airflow sensor matches a modeled airflow, and/or whether a pressure or temperature sensed anywhere in the system matches a counterpart modeled pressure or temperature, as desired. Further, while Feature Set 1 shows three features, there may be any number of features, including 1, 2, 3, 4, 5, etc., without limitation. For example, Feature Set 1 is configured for an implementation of a twin scroll turbocharger having an exhaust manifold pressure sensor available in the system. In another example, the twin scroll feature can be omitted, and the feature set can omit $I_3$ (which relies on a balance valve model that would not be present without the twin scroll turbine), and $I_2$ would simply refer to $p_3^{seas}$ and $p_3$, instead.

In some examples, the change analysis blocks 322 are embodied as software components, or as dedicated hardware components, that apply a change probability model. One suitable change probability model is a Sequential Probability Ratio Test (SPRT). Others suitable change probability models may include, for example and without limitation, a generalized likelihood ratio algorithm, a scaled sequential probability ratio test, a truncated sequential probability ratio test, and/or an exact binomial test. In some examples, the fault detection block performs an overall SPRT algorithm that returns a Boolean output 0 (no change) or 1 (change). When an overall change is identified, the change analysis block 320 generates an output indicating that a change has occurred, and also provides individual SPRT outputs $W_1$, $W_2$, $W_3$ that the fault identifier 340 uses to isolate or identify the specific fault at issue.

In a specific example using SPRT, the approach can be understood as the repeated testing of two alternative hypotheses about the tested parameter:

$H_0$: $\theta=\theta_0$ {Null Hypothesis}

$H_0$: $\theta=\theta_1$ {Change/Fault} \hfill {Eq. 27}

As long as the decision is in favor of $H_0$, the test continues. Testing may or may not stop upon a decision in favor of $H_1$. For example, testing may not stop to track a self-healing condition (a valve temporarily stuck). Where the outcome of the analysis is used to modify other system parameters, or analyses, if the decision reverts to $H_0$ then the modified system parameters or analyses may be reverted to their prior state. The decision rule can be written in a recursive manner as shown by Equation 28:

$d=0$ if $S_{k+1} \geq 0$ or $d=1$ if $S_{k+1}=\varepsilon$ \hfill {Eq. 28}

Where the recursive term $S_{k+1}$ is defined as shown in Equation 29:

$S_{k+1}=\min(\varepsilon, S_k+s_k)$ if $S_k+s_k>0$ or $S_{k+1}=\max(0, S_k+s_k)$ if $S_k+s_k \leq 0$ \hfill {Eq. 29}

Where, in these two expressions, $s_k$ is the log-likelihood ratio, and c is the threshold alarm value. The log-likelihood ratio $s_k$ is defined as:

$$s_k = \ln\left(\frac{p(g|\theta_1)}{p(g|\theta_0)}\right) \hfill \{\text{Eq. 30}\}$$

Where $p(\bullet)$ is the probability density function (PDF). The PDF may be parameterized using a common model, for example, a real valued random variable having a normal distribution. In some examples, the PDF can be thus parameterized using a mean ($\mu$) and standard deviation ($\sigma$). Then the parameter vector can be represented as $\theta_0=[\mu, \sigma]$ for the null hypothesis $H_0$. The alternative hypothesis $H_1$ is parameterized as $\theta_1=[\mu_a, \sigma_a]$. The $H_0$ PDF, when normalized, has parameters $\bar{\mu}=0$, $\bar{\sigma}=1$, and is given in Equation 31:

$$p(g|\mu, \sigma) = \frac{1}{\sqrt{2\pi}} e^{-\frac{1}{2}x^2} \hfill \{\text{Eq. 31}\}$$

Where x is the vector of realizations, and the expression shown is a standard normal distribution. Other distributions may be used; a simplified algorithm is provided here for illustrative purposes. The $H_1$ PDF, when normalized, has parameters $\mu_a$, $\sigma_a$, and is given as:

$$p(g|\mu_a, \sigma_a) = \frac{1}{\sigma_a\sqrt{2\pi}} e^{-\frac{1}{2}\left(\frac{x-\mu_a}{\sigma_a}\right)^2} \hfill \{\text{Eq. 32}\}$$

Figure 6A:
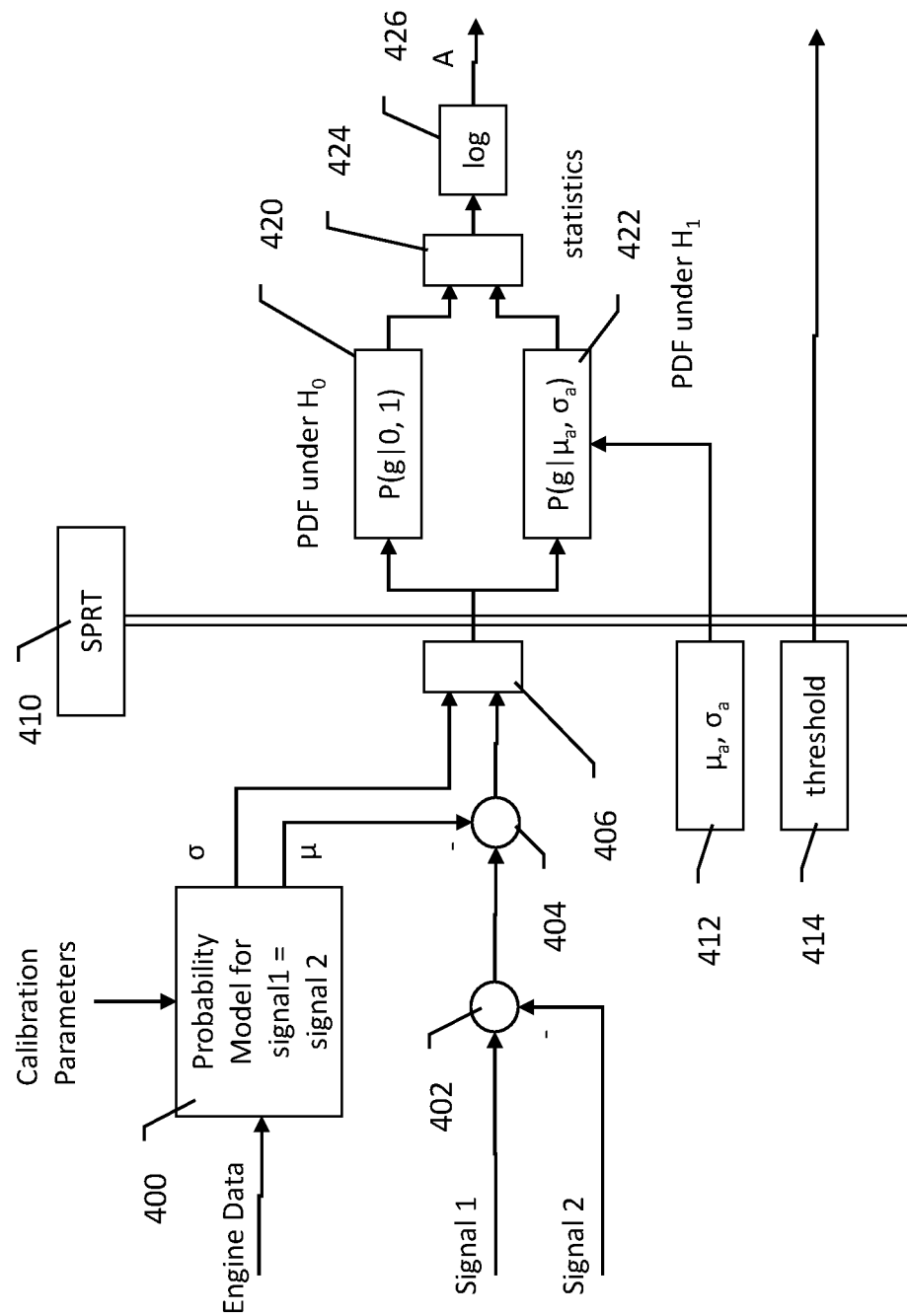
FIGS. 6A-6B illustrate an example health monitor and method.
Figure 6B:
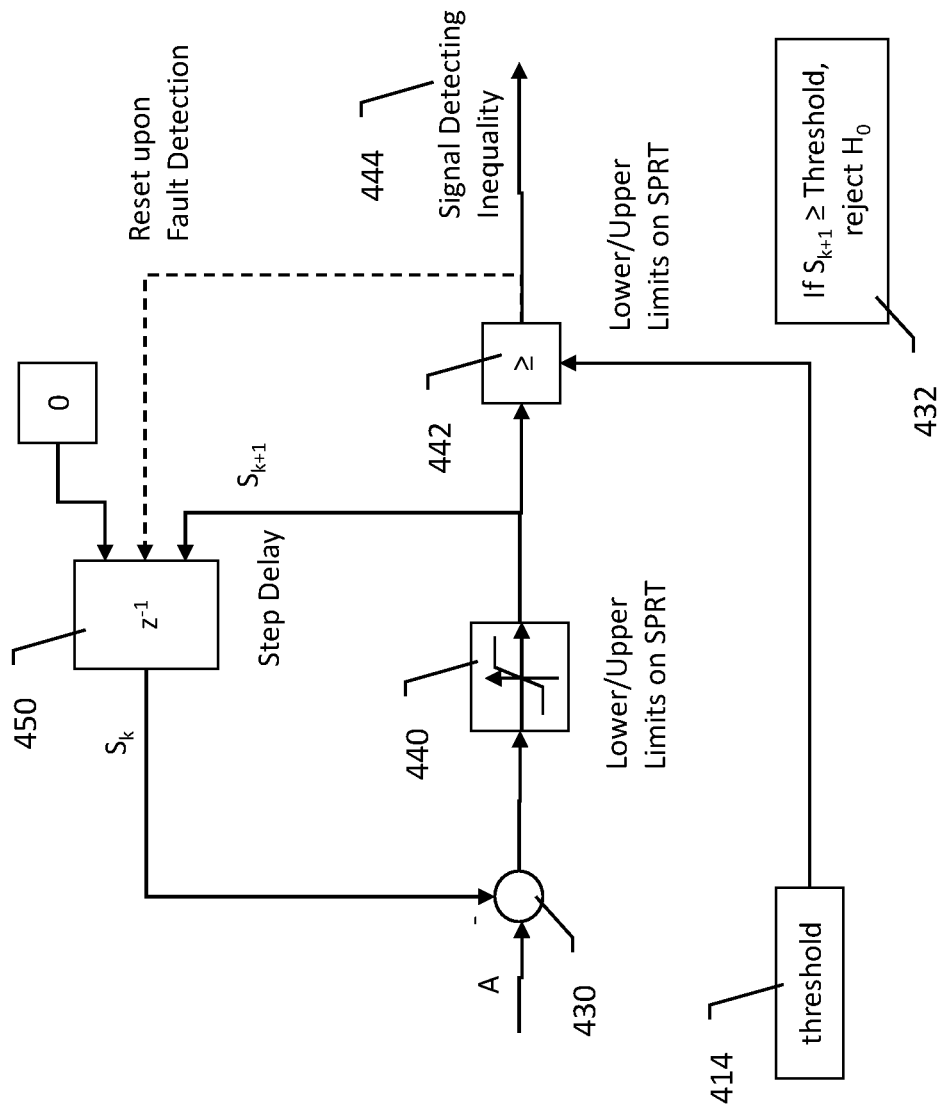

An illustrative SPRT method is shown as a process flow in FIGS. 6A-6B.

Starting with FIG. 6A, the system relies on a probability model 400 useful for determining whether two signals are equal, where the model is based on input engine data and calibration parameters. As noted above, the probability model in this example may be parameterized using a mean ($\mu$) and standard deviation ($\sigma$). Signal 1 and Signal 2 are obtained and compared at 402 (by subtraction in this example), with the difference then being compared to the mean difference at 404 (again by subtraction in this example). The output form 404 is divided by the standard deviation at 406, and the result is provided to the SPRT analysis 410. Next, the two PDFs for the null hypothesis 420 and the alternative hypothesis 422 are compared to the output of block 406. The statistical data is output to 424, and the log is then taken at 426, implementing Equation 30 to provide a result, A.

Turning to FIG. 6B, A is then compared to $S_k$. Upper and lower limits are applied to the difference between A and $S_k$, as indicated at 440, yielding the output $S_{k+1}$. The value of $S_{k+1}$ is compared to the threshold 414 for identifying a signal inequality. Threshold 414 will have been generated in a calibration procedure, an example of which is shown below. If the threshold 414 is exceeded at block 442, a signal detecting inequality is generated, as indicated at 444.

The value for $S_{k+1}$ is also provided to a step delay block at 450 for use in a subsequent iteration. Block 450 generates the new value for $S_{k+1}$ using Equation 29. Optionally, block 450 may reset upon fault detection, as indicated in the Figure by the broken line. As noted at 432, the null hypothesis is rejected if $S_{k+1}$ exceeds the threshold in block 442.

Turning back to FIG. 5, within block 320 each of the features is directed to a separately configured Change Probability (CP) Model. In some examples, each such block 322 has a separately defined and calibrated SPRT analysis. Thus, there is a 1:1 ratio of calibrated SPRT analyses to feature indicators 304, as each feature indicator 304 is separately analyzed. For calibration of each block 322, the separate feature indicators can be analyzed individually.

For example, calibration can be performed for each SPRT method by starting with the generation of the nominal error signal for each non-fault case (null hypothesis). Equation 33 may be used, for example:

$$x_0 = \text{Signal}_{1|Fault\_Off} - \text{Signal}_{2|Fault\_Off} \quad \{\text{Eq. 33}\}$$

Using Feature Set 1, for example, calibrating an SPRT for $I_1$ may be performed using $m_{A,EGRv}$ as Signal$_1$, and $m_{A,\lambda}$ as Signal$_2$, each as determined in a non-fault condition while the entering conditions are met. The mean ($\mu$) and standard deviation ($\sigma$) can each be calculated for $x_0$, allowing normalization of $x_0$.

Next, the error signals for $H_1$ is calculated for each fault under analysis. For example, assuming three faults A, B, C, separate error signals for each can be calculated as shown by Equations 34-36:

$$x_{1,\{A\}} = \text{Signal}_{1|\{A\}Fault\_On} - \text{Signal}_{2|\{A\}Fault\_On} \quad \{\text{Eq. 34}\}$$

$$x_{1,\{B\}} = \text{Signal}_{1|\{B\}Fault\_On} - \text{Signal}_{2|\{B\}Fault\_On} \quad \{\text{Eq. 35}\}$$

$$x_{1,\{C\}} = \text{Signal}_{1|\{C\}Fault\_On} - \text{Signal}_{2|\{C\}Fault\_On} \quad \{\text{Eq. 36}\}$$

In an example, the faults may be A: Aftertreatment Fault, B: EGR Fault, and C: Balance valve fault, using the airpath example provided above. Normalized values for each of the separate error signals are created using the mean and standard deviation of $x_0$, for example:

$$\bar{x}_{1,\{A\}} = \frac{x_{1,\{A\}} - \mu}{\sigma} \quad \{\text{Eq. 37}\}$$

Similar normalization would be calculated for the remaining error signals. For each of the faulty realizations, mean and standard deviation can then be computed providing two data sets of $\Delta = \{\mu_{a\{A\}}, \mu_{a\{B\}}, \mu_{a\{C\}}\}$ and $\Sigma = \{\sigma_{a\{A\}}, \sigma_{a\{B\}}, \sigma_{a\{C\}}\}$. Next, the PDF for each of the nominal (null hypothesis) and faulty realizations are then computed, and $S_{k+1}$ for each PDF is calculated. A threshold alarm value for each SPRT is then selected, with reference to the Expert Table (FIG. 7, below) to ensure the desired logical states can be achieved. The global tuning for each of the alternative hypothesis is then selected from the sets of A and $\Sigma$ for the faulty realizations. The result, in this example, is that each alternative hypothesis for each SPRT has an alarm value with a cumulated sum $S_{k+1}$. Finally, the Expert Table logical states are confirmed by evaluation of the non-selected tunings.

Figure 7:
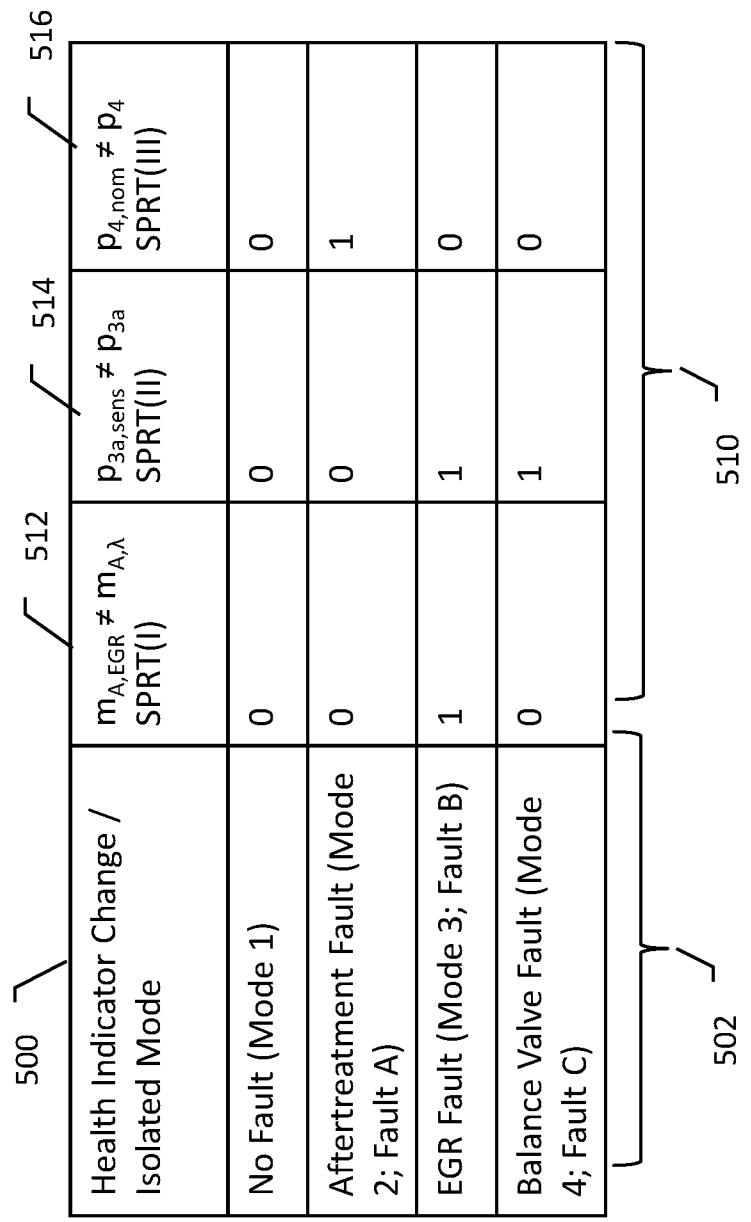

FIG. 7 illustrates an Expert Table for an airflow system associated with an engine. In the example shown, the Expert Table 500 is filled with a number of modes at 502, with one No Fault mode and several Fault modes. A set of SPRTs is illustrated in the remaining columns at 510. Each SPRT provides a Boolean 0 or 1 output in this particular example. In the nominal or no-fault state, each SPRT returns a 0. The Fault modes are identified by assessment of the combination of SPRTs that return a 1, as illustrated. For example, Mode 3 is identified in response to both SPRT(I) 512 and SPRT(II) 514 being present, while Mode 4 requires SPRT(II) 514 but not SPRT(I) 512, all without SPRT(III) 516 being present. Thus each combination is particular to a select mode.

The table in FIG. 7 may be augmented with additional lines to account for any and all combinations of SPRT events. More than one line in the table may be linked to a particular Mode, if desired, and/or more than one Mode may be linked to a particular combination. In some examples, both Mode 2 and Mode 3 may be triggered if all three SPRTs are present, assuming that mitigations are available for both faults associated with those modes and assuming all mitigations can be performed simultaneously. On the other hand, in other examples, a system may be unable to assure continued operation within operating boundaries (whether for safety, performance, environmental, emissions or other reasons) when multiple Faults are present, causing the system to issue an overall error/fault warning or requiring shut-down in response to some combinations of SPRTs. Such determinations may vary by implementation.

The example shown in FIG. 7 is for a system such as shown in FIG. 2, having a twin scroll turbine and balance valve. For a system as in FIG. 1 (lacking the twin scroll turbine and balance valve), the Expert Table of FIG. 7 can be simplified by removing the fourth Fault mode. In some examples, the EGR Fault (Mode 3) may be identified using a logical "OR" for SPRT(I) and SPRT(II); in other examples, a Boolean 1 for both of SPRT(I) or SPRT(II) may be required for identifying EGR fault. As indicated in the description of the modes at 502, the Faults may be linked to A, B, and C, as used above.

FIG. 8 illustrates another Expert Table, this time directed at both fault identification and health degradation. Referring first to FIG. 5, there may be any number of CP Models and feature inputs. Some feature inputs may be as illustrated above with respect to FIG. 7, and directed to the identification of actual faults. One feature input may be monitored by more than one CP Model, if desired. In FIG. 8, $I_1$ of Feature Set 1, above, is analyzed for change using a plurality of different thresholds, with one such threshold selected for large divergence between the two mass air flows and indicative of a fault. In this example, the Expert Table 550 of FIG. 8 uses SPRT(I), at 552, to monitor for a large change indicating EGR Fault, as indicated by Mode 2. Another CP Model, shown in FIG. 8 as SPRT(II) may be calibrated and tuned to identify smaller gradations of change. In the Expert Table 550, when SPRT(I) 552 returns a Boolean 1, EGR Fault is identified (whether SPRT(II) returns a 1 or a 0 may be considered as well, if desired). If, instead, only SPRT(II) is triggered, an EGR Aging flag is identified. The Fault/Health Mitigator 350 (FIG. 5) may then respond by calling for reconfiguration of one or more parameters used in the State Observer 300 and/or the Optimizer (230 in FIG. 4) to adjust how operations are performed to account for the component aging. With models updated, SPRT(II) 554 (FIG. 8) is reset, and again monitors for further incremental change. In some examples, the State Observer may run separate calculations for certain parameters to maintain both an original configuration analysis, which would enable SPRT(I) in FIG. 8 to monitor for changes relative to the original configuration to identify Faults, while SPRT(II) monitors for changes relative to the current configuration to identify aging.

Figure 9:
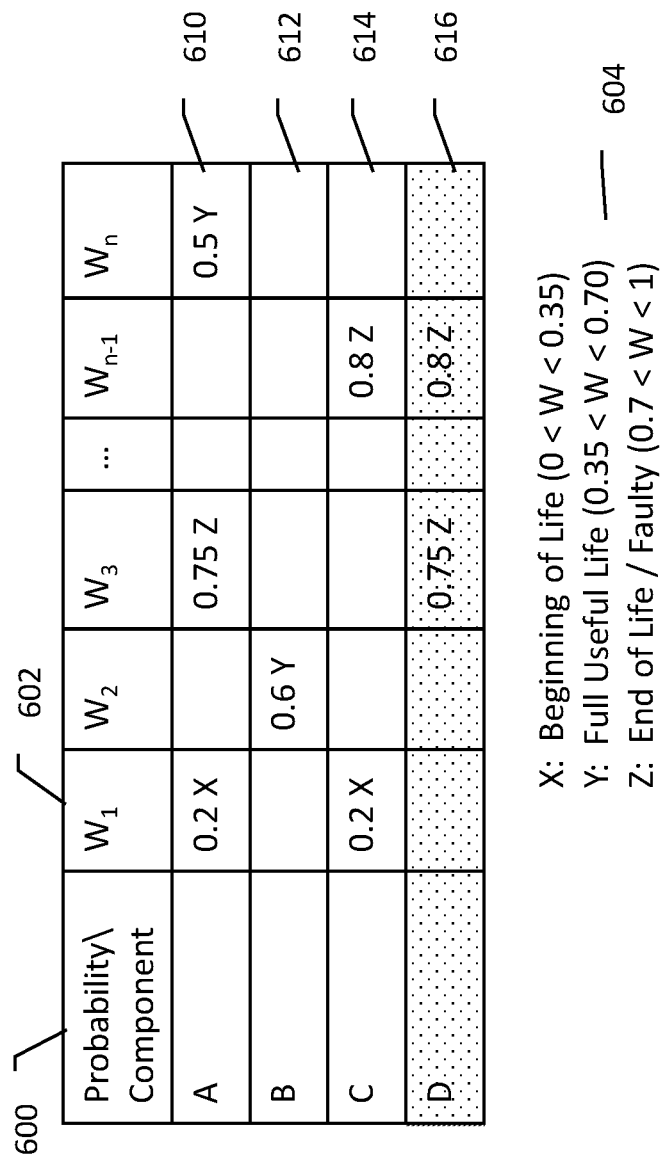

FIG. 9 shows how health degradation may be tracked using probability dominance. Here, the plurality of W factors that are provided to the Fault Identifier (340 in FIG. 5) are parsed, with the correlation between each W factor and the condition it identifies noted. Thus, for each of a set of components A, B, C, D 600, the change model outputs $\{W_1, W_2 \ldots W_n\}$ 602 are rated as indicating a likelihood of fault and/or present state information. In some examples, the change model outputs are continuous variables. Each value for W may be normalized, for example, in a range of 0 to 1, and these may be bracketed as shown at 604 into Beginning of Life (BOL), Full Useful Life, and End of Life (EOL), as desired. Linear normalization need not be used. When, for example, $W_1$ is in the BOL range, the components whose health is indicated by $W_1$ have a value assigned and entered in the relevant cells—here, row 610 for component A, and row 614 for component C. In this example, an approach is taken where the lowest value assigned to any component is used as that component's health status. Therefore, component A is deemed to be in its BOL range due to the value for $W_1$, even though other applicable change model outputs ($W_3$ and $W_n$) have higher values; other approaches may be used including blended, averaged, etc. With the example shown, component B would be deemed to be in its full useful life, no longer at BOL but not yet at EOL (assuming no other W factors are applicable), while component D is found to be at EOL, as the lowest W value of 0.75 is indicative of EOL. Over time, it may be expected that one or more of the W values will increase due to aging of the system components A-D, as the change model outputs continue to track. When a component reaches the EOL boundary, a system alert can be issued to the user of the system or vehicle, and or may be communicated to a central database for a fleet of vehicles, for example. In addition, as a component reaches any relevant boundary, mitigations discussed above for managing system operation when a component has reached EOL can be implemented.

It may also be noted that the table at 604 may include both aging/health factors as well as fault-related health factors. Thus, for example, one or more of the W factors may relate to aging and health, while others relate to faults. A specific example may be, for example, a factor that considers the capability of a valve to reach its full range of motion when actuated, something that can be monitored as well using an SPRT by, for example, observing the extremity of motion of a given valve. In addition, flow through the valve, referenced to a control signal applicable to the valve, may be compared to modeled operation for the valve and, when the flow does not match the model as determined using an SPRT or other change analysis, valve failure or blockage may be identified. Thus a single component may be monitored for each of aging and fault using separate metrics reflected in the expert table.

In another example, each change model output is a Boolean value, and, reliant on the use of separate change models corresponding to Faults or Aging increments, different determinations as to the meaning of an identified change can be flagged as shown. That is, for component A, the presence of a Boolean 1 for $W_1$ indicates the component is still operating at its beginning of life; on the other hand, a Boolean 1 for $W_n$ indicates component A is at the end of life or is presenting a fault. The Boolean approach may also be understood by reference to FIGS. 7-8.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." Moreover, in the claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, innovative subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the protection should be determined with reference to the appended claims, along with the full scope of equivalents to which such claims are entitled.

What is claimed is:

1. A system comprising a physical plant comprising:
an engine having an intake manifold and an exhaust manifold, with a combustion chamber therebetween into which a fuel quantity is provided;
an airflow system coupled to the engine, the airflow system having a turbocharger with a compressor and a twin scroll turbine, an exhaust gas recirculation (EGR) valve, a first exhaust airpath from the exhaust manifold to a first scroll of the turbine, a second exhaust airpath from the exhaust manifold to a second scroll of the turbine and a balance valve controllably allowing airflow between the first and second exhaust airpaths; and
an aftertreatment system coupled to the airflow system downstream of the turbine; and
a configurable controller for controlling the physical plant having associated therewith a plurality of actuators for controlling operation of the physical plant and a plurality of sensors for observing a plurality of characteristics of the physical plant operations, the configurable controller comprising:
a state observer configured to capture the current state of the physical plant by communication with the plurality of sensors;
a feature calculator configured to receive current state data from the state observer and calculate at least one feature parameter reflecting a state of health of at least one component of the physical plant;
an optimizer configured to optimize behavior of the physical plant using at least the actuators;
a health estimator configured to receive the at least one feature parameter from the feature calculator and, subject to one or more entering conditions, apply a change probability model to the at least one feature parameter to determine whether the at least one feature parameter has changed to an extent indicative of a fault or health related degradation and, if so, to generate a change indicator; and
a fault isolator configured to receive the change indicator and identify which component of the physical plant that is subject to a fault or health degradation, and to generate a fault indicator indicating the identified fault;

wherein the at least one feature parameter comprises:
a first feature parameter related to mass air flow;
a second feature parameter related to exhaust manifold air pressure; and
a third feature parameter related to pressure downstream of the turbine.

2. The system of claim 1 further comprising a mitigator configured to modify the optimizer responsive to the fault indicator, wherein:
the optimizer is configured to use a plurality of factors to optimize behavior of the physical plant, each factor associated with a weight, and, prior to the health estimator generating the change indicator, the optimizer uses a first set of weights; and
the mitigator is configured to respond to the fault indicator by modifying or replacing the first set of weights to thereby modify the optimizer.

3. The system of claim 1 wherein the optimizer is configured to use at least first and second models to optimize behavior of the physical plant, by:
relying on the first model when the fault isolator fails to generate the fault indicator; and
relying on the second model when the fault isolator generates the fault indicator.

4. The system of claim 1 further comprising a mitigator configured to modify the state observer responsive to the fault indicator, wherein:
the state observer is configured to apply one or more tuning parameters to monitor the current state of the physical plant; and
the mitigator is configured to respond to the fault indicator by modifying or replacing one or more of the tuning parameters used by the state observer.

5. The system of claim 1 wherein the fault isolator is configured to determine which component of the physical plant is subject to fault by analysis of which of the at least one feature parameters has changed.

6. The system of claim 5 wherein the fault isolator is configured to:
identify an aftertreatment fault if the third feature parameter has changed;
identify an EGR fault if both the first and second feature parameters have changed; and
identify a balance valve fault if the second feature parameter has changed but the first feature parameter has not changed.

7. An engine system comprising:
an engine having an intake manifold and an exhaust manifold, with a combustion chamber therebetween into which a fuel quantity is provided;
an airflow system coupled to the engine, the airflow system having a turbocharger including a compressor and a turbine, and an exhaust gas recirculation (EGR) valve;
an aftertreatment system including a Lambda sensor; and
a configurable controller for controlling the engine, the airflow system, and the aftertreatment system, comprising:
a state observer configured to capture the current state of the engine, airflow system, and aftertreatment system;
a feature calculator configured to calculate a first feature parameter related to mass airflow, a second feature parameter related to exhaust manifold air pressure, and a third feature parameter related to pressure downstream of the turbine using data received from the state observer;

an optimizer configured to optimize behavior of the engine, airflow system, and aftertreatment system using the current state of the engine and at least one model or setpoint;

a health estimator configured to receive the first, second and third feature parameters and, subject to one or more entering conditions, apply a change probability model to the first, second, and third feature parameters to determine whether any of the first, second or third feature parameters has changed to an extent indicative of a fault and, if so, to generate a change indicator; and a fault isolator configured to receive the change indicator and identify a fault by identifying a system component that is subject to a fault as indicated by the change indicator, and generate a fault indicator indicating the identified fault; wherein the fault isolator is configured to:

identify an aftertreatment fault if only the third feature parameter has changed; or identify an EGR fault if either one, or both of, the first and second feature parameters have changed; wherein the optimizer is configured to use each of: a first model related to aftertreatment airflow; and a second model related to EGR flow; and the system further comprises a health mitigator configured to modify operation of the optimizer to: replace or reduce reliance on the first model responsive to an identified aftertreatment fault; and replace or reduce reliance on the second model responsive to an identified EGR fault.

8. The engine system of claim 7 further comprising an exhaust manifold pressure sensor, wherein:

the optimizer comprises one or more models reliant on a pressure sensed by the exhaust manifold pressure sensor; and the health mitigator is configured, responsive to a fault, to increase reliance by the optimizer on the one or more models reliant on the pressure sensed by the exhaust manifold pressure sensor.

9. The engine system of claim 7 further comprising a turbocharger speed sensor, wherein:

the optimizer comprises one or more models reliant on a speed sensed by the turbocharger speed sensor; and the health mitigator is configured, responsive to a fault, to increase reliance by the optimizer on the one or more models reliant on the speed sensed by the turbocharger speed sensor.

10. An engine system comprising:

an engine having an intake manifold and an exhaust manifold, with a combustion chamber therebetween into which a fuel quantity is provided;

an airflow system coupled to the engine, the airflow system having a turbocharger having a compressor and a twin scroll turbine, an exhaust gas recirculation (EGR) valve, a first exhaust airpath from the exhaust manifold to a first scroll of the turbine, a second exhaust airpath from the exhaust manifold to a second scroll of the turbine and a balance valve controllably allowing airflow between the first and second exhaust airpaths;

an aftertreatment system including a Lambda sensor; and a configurable controller for controlling the engine, the airflow system, and the aftertreatment system, comprising:

a state observer configured to capture the current state of the engine, airflow system, and aftertreatment system;

a feature calculator configured to calculate a first feature parameter related to mass air flow, a second feature parameter related to exhaust manifold air pressure, and a third feature parameter related to pressure downstream of the turbine using data obtained from the state observer;

an optimizer configured to optimize behavior of the engine, airflow system, and aftertreatment system based on the current state of the engine and at least one model or setpoint;

a health estimator configured to receive the first, second and third feature parameters and, subject to one or more entering conditions, apply a change probability model to the first, second, and third feature parameters to determine whether any of the first, second or third feature parameters has changed to an extent indicative of a fault and, if so, to generate a change indicator; and a fault isolator configured to receive the change indicator and identify a fault by identifying a system component that is subject to a fault and generate a fault indicator indicating the identified fault.

11. The engine system of claim 10 wherein the fault isolator is configured to:

identify an aftertreatment fault if the third feature parameter has changed;

identify an EGR fault if both the first and second feature parameters have changed; and identify a balance valve fault if the second feature parameter has changed but the second feature parameter has not changed.

12. The engine system of claim 11 wherein the optimizer is configured to use each of:

a first model related to aftertreatment airflow;

a second model related to EGR flow; and a third model related to balance valve flow; and the system further comprises a health mitigator configured to modify operation of the optimizer to:

replace or reduce reliance on the first model responsive to an identified aftertreatment fault;

replace or reduce reliance on the second model responsive to an identified EGR fault;

replace or reduce reliance on the third model responsive to an identified balance valve fault.

13. The engine system of claim 12 further comprising an exhaust manifold pressure sensor, wherein:

the optimizer comprises one or more models reliant on a pressure sensed by the exhaust manifold pressure sensor; and the health mitigator is configured, responsive to a fault, to increase reliance by the optimizer on the one or more models reliant on the pressure sensed by the exhaust manifold pressure sensor.

14. The engine system of claim 12 further comprising a turbocharger speed sensor, wherein:

the optimizer comprises one or more models reliant on a speed sensed by the turbocharger speed sensor; and the health mitigator is configured, responsive to a fault, to increase reliance by the optimizer on the one or more models reliant on the speed sensed by the turbocharger speed sensor.

* * * * *